(12) United States Patent
Medard et al.

(10) Patent No.: US 9,185,529 B2
(45) Date of Patent: Nov. 10, 2015

(54) WIRELESS RELIABILITY ARCHITECTURE AND METHODS USING NETWORK CODING

(71) Applicants: Muriel Medard, Belmont, MA (US); Xiaomeng Shi, West Roxbury, MA (US); Marie-Jose Montpetit, Jamaica Plain, MA (US); Surat Teerapittayanon, Somerville, MA (US); Kerim Fouli, Cambridge, MA (US)

(72) Inventors: Muriel Medard, Belmont, MA (US); Xiaomeng Shi, West Roxbury, MA (US); Marie-Jose Montpetit, Jamaica Plain, MA (US); Surat Teerapittayanon, Somerville, MA (US); Kerim Fouli, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 231 days.

(21) Appl. No.: 13/968,566

(22) Filed: Aug. 16, 2013

(65) Prior Publication Data

US 2014/0269503 A1  Sep. 18, 2014

Related U.S. Application Data

(60) Provisional application No. 61/791,321, filed on Mar. 15, 2013.

(51) Int. Cl.
| | |
|---|---|
| *H04W 80/04* | (2009.01) |
| *H04W 88/06* | (2009.01) |
| *H04W 28/04* | (2009.01) |
| *H04W 72/04* | (2009.01) |
| *H04W 4/06* | (2009.01) |
| *H04L 1/00* | (2006.01) |
| *H04W 40/00* | (2009.01) |

(52) U.S. Cl.
CPC ............... *H04W 4/06* (2013.01); *H04L 1/0011* (2013.01); *H04W 28/04* (2013.01); *H04W 40/00* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

| | | |
|---|---|---|
| 5,577,056 A | 11/1996 | Malik et al. |
| 6,128,773 A | 10/2000 | Snider |
| 6,621,851 B1 | 9/2003 | Agee et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

"Data Service Options for Spread Spectrum Systems: Radio Link Protocol Type 3;" 3GPP2 C.S0017-010-A; Version 2.0; Sep. 2005.

(Continued)

*Primary Examiner* — Ronald B Abelson
(74) *Attorney, Agent, or Firm* — Daly, Crowley, Mofford & Durkee, LLP

(57) ABSTRACT

Network-coding-enabled reliability architectures and techniques are provided that are capable of enhancing data transfer reliability and efficiency in next generation wireless networks. In some embodiments, the techniques and architectures utilize a flexible thread-based coding approach to implement network coding. The techniques and architectures may also, or alternatively, utilize systematic intra-session random linear network coding as a packet erasure code to support reliable data transfer.

26 Claims, 6 Drawing Sheets

(56) References Cited

U.S. PATENT DOCUMENTS

| | | | |
|---|---|---|---|
| 6,885,653 | B2 | 4/2005 | Choi et al. |
| 7,064,489 | B2 | 6/2006 | Price |
| 7,071,853 | B2 | 7/2006 | Price |
| 7,095,343 | B2 | 8/2006 | Xie et al. |
| 7,164,691 | B2 | 1/2007 | Knapp et al. |
| 7,283,564 | B2 | 10/2007 | Knapp et al. |
| 7,349,440 | B1 | 3/2008 | Chou et al. |
| 7,408,938 | B1 | 8/2008 | Chou et al. |
| 7,414,978 | B2 | 8/2008 | Lun et al. |
| 7,529,198 | B2 | 5/2009 | Jain et al. |
| 7,706,365 | B2 | 4/2010 | Effros et al. |
| 7,760,728 | B2 | 7/2010 | Chou et al. |
| 7,821,980 | B2 | 10/2010 | Chakrabarti et al. |
| 7,876,677 | B2 | 1/2011 | Cheshire |
| 7,912,003 | B2 | 3/2011 | Radunovic et al. |
| 7,945,842 | B2 | 5/2011 | He |
| 8,040,836 | B2 | 10/2011 | Wu et al. |
| 8,068,426 | B2 | 11/2011 | Sundararajan et al. |
| 8,130,776 | B1 | 3/2012 | Sundararajan et al. |
| 8,279,781 | B2 | 10/2012 | Lucani et al. |
| 8,451,756 | B2 | 5/2013 | Lucani et al. |
| 8,482,441 | B2 | 7/2013 | Medard et al. |
| 8,504,504 | B2 | 8/2013 | Liu |
| 8,571,214 | B2 | 10/2013 | Lima et al. |
| 2003/0055614 | A1 | 3/2003 | Pelikan |
| 2003/0214951 | A1 | 11/2003 | Joshi et al. |
| 2004/0203752 | A1 | 10/2004 | Wojaczynski et al. |
| 2005/0010675 | A1 | 1/2005 | Jaggi et al. |
| 2005/0078653 | A1 | 4/2005 | Agashe et al. |
| 2005/0152391 | A1* | 7/2005 | Effros et al. ............... 370/432 |
| 2005/0251721 | A1 | 11/2005 | Ramesh et al. |
| 2006/0020560 | A1 | 1/2006 | Rodriguez et al. |
| 2006/0146791 | A1 | 7/2006 | Deb et al. |
| 2006/0224760 | A1 | 10/2006 | Yu et al. |
| 2007/0046686 | A1 | 3/2007 | Keller |
| 2007/0116027 | A1 | 5/2007 | Ciavaglia et al. |
| 2007/0274324 | A1 | 11/2007 | Wu et al. |
| 2008/0043676 | A1 | 2/2008 | Mousseau et al. |
| 2008/0049746 | A1 | 2/2008 | Morrill et al. |
| 2008/0123579 | A1 | 5/2008 | Kozat et al. |
| 2008/0259796 | A1 | 10/2008 | Abousleman et al. |
| 2008/0291834 | A1 | 11/2008 | Chou et al. |
| 2008/0320363 | A1 | 12/2008 | He et al. |
| 2009/0003216 | A1 | 1/2009 | Radunovic et al. |
| 2009/0135717 | A1 | 5/2009 | Kamal et al. |
| 2009/0153576 | A1 | 6/2009 | Keller |
| 2009/0175320 | A1 | 7/2009 | Haustein et al. |
| 2009/0198829 | A1 | 8/2009 | Sengupta et al. |
| 2009/0207930 | A1 | 8/2009 | Sirkeci et al. |
| 2009/0238097 | A1 | 9/2009 | Le Bars et al. |
| 2009/0248898 | A1 | 10/2009 | Gkantsidis et al. |
| 2009/0285148 | A1 | 11/2009 | Luo et al. |
| 2009/0310582 | A1 | 12/2009 | Beser |
| 2009/0313459 | A1 | 12/2009 | Horvath |
| 2009/0316763 | A1 | 12/2009 | Erkip et al. |
| 2010/0014669 | A1 | 1/2010 | Jiang |
| 2010/0046371 | A1 | 2/2010 | Sundararajan et al. |
| 2010/0111165 | A1 | 5/2010 | Kim et al. |
| 2010/0146357 | A1 | 6/2010 | Larsson |
| 2011/0238855 | A1 | 9/2011 | Korsunsky et al. |
| 2012/0057636 | A1 | 3/2012 | Tian et al. |
| 2012/0218891 | A1 | 8/2012 | Sundararajan et al. |
| 2012/0300692 | A1 | 11/2012 | Sfar et al. |
| 2013/0107764 | A1* | 5/2013 | Zeger et al. ............... 370/280 |
| 2013/0114481 | A1 | 5/2013 | Kim et al. |
| 2013/0114611 | A1 | 5/2013 | Zeger et al. |
| 2013/0195106 | A1* | 8/2013 | Calmon et al. ............ 370/389 |
| 2014/0064296 | A1* | 3/2014 | Haeupler et al. .......... 370/412 |
| 2014/0185803 | A1 | 7/2014 | Lima et al. |
| 2014/0268398 | A1 | 9/2014 | Medard et al. |
| 2014/0269485 | A1* | 9/2014 | Medard et al. ............ 370/312 |
| 2014/0269503 | A1 | 9/2014 | Medard et al. |
| 2014/0269505 | A1* | 9/2014 | Medard et al. ............ 370/328 |
| 2014/0280395 | A1 | 9/2014 | Medard et al. |
| 2014/0280454 | A1 | 9/2014 | Medard et al. |

FOREIGN PATENT DOCUMENTS

| | | | |
|---|---|---|---|
| WO | WO 2010/005181 | A2 | 1/2010 |
| WO | WO 2010/005181 | A3 | 1/2010 |
| WO | WO 2010/025362 | A2 | 3/2010 |
| WO | WO 2010/025362 | A3 | 3/2010 |
| WO | WO 2011/043754 | A1 | 4/2011 |
| WO | WO 2011/119909 | A1 | 9/2011 |
| WO | WO 2012/167034 | A2 | 12/2012 |
| WO | WO 2013/006697 | A2 | 1/2013 |
| WO | WO 2013/067488 | A1 | 5/2013 |
| WO | WO 2013/116456 | A1 | 8/2013 |
| WO | WO 2014/159570 | A1 | 10/2014 |
| WO | WO 2014/160194 | A3 | 10/2014 |

OTHER PUBLICATIONS

"Guest Editorial Wireless Video Transmission;" IEEE Journal on Selected Areas in Communications; vol. 28, No. 3; Apr. 2010; pp. 297-298.

Abichar, et al.; "WiMax vs. LTE: Who Will Lead the Broadband Mobile Internet?;" Mobile Computing; IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed Network Storage?;" Proc. 1$^{st}$ Workshop on Network Coding, Theory, and Applications (Netcod'05); Apr. 2005; 6 pages.

Adamson, et al.; "Multicast Negative-Acknowledgment (NACK) Building Blocks;" Internet Engineering Task Force (IETF),RFC; vol. 5401; Nov. 2008; 42 pages.

Adamson, et al.; "NACK-Oriented Reliable (NORM) Transport Protocol;" Internet Engineering Task Force (IETF); RFC; vol. 5740; Nov. 2009; 94 pages.

Adamson, et al.; "Quantitative Prediction of NACK-Oriented Reliable Multicast (NORM) Feedback;" Proceedings, MILCOM 2000; vol. 2; Oct. 2002, 6 pages.

Ahiswede, et al.; "Network Information Flow;" IEEE Transactions on Information Theory; vol. 46; No. 4; Jul. 2000; pp. 1204-1216.

Ahmed, et al.; "On the Scaling Law of Network Coding Gains in Wireless Networks;" IEEE; MILCOM 2007; Oct. 2007; 7 pages.

Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.

Armstrong, et al.; "Distributed Storage with Communcation Costs;" IEEE Forty-Ninth Annual Allerton Conference—Allerton House; Sep. 28-30, 2011; pp. 1358-1365.

Awerbuch, et al.; "On-Line Generalized Steiner Problem;" Proceedings of the 7$^{th}$ Annual ACM-SIAM Symposium on Discrete Algorithms; pp. 1-12; 1996.

Baek, et al.; "The International Journal of Computer and Telecommunications Networking;" vol. 56; issue 6; Apr. 2012; pp. 1745-1762.

Baron, et al.; "Coding Schemes for Multislot Messages in Multichannel ALOHA With Deadlines;" IEEE Transactions on Wireless Communications; vol. 1; No. 2; Apr. 2002; pp. 292-301.

Bellare, et al.; "A Concrete Security Treatment of Symmetric Encryption: Analysis of the DES Modes of Operation;" Proc. 38$^{th}$ Annual Symposium on Foundations of Computer Science; Oct. 1997; pp. 1-32.

Berman, et al.; "Improved Approximations for the Steiner Tree Problem;" Journal of Algorithms; Chapter 39; pp. 325-334.

Bhadra, et al.; "Looking at Large Networks: Coding vs. Queuing;" Proc. of the 25$^{th}$ IEEE International Conference on Computer Communications (INFOCOM); Apr. 2006; 12 pages.

Bharath-Kumar, et al.; "Routing to Multiple Destinations in Computer Networks;" IEEE Transactions on Communications; vol. Com-31; No. 3; Mar. 1983; pp. 343-351.

Bhargava, et al.; "Forward Error Correction Coding;" Mobile Communications Handbook; Part 1: Basic Principals; 1999; 18 pages.

(56) References Cited

OTHER PUBLICATIONS

Birk, et al.; "Judicious Use of Redundant Transmissions in Muitichannel ALOHA Networks with Deadlines;" IEEE Journal on Selected Areas in Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.

Borokhovich, et al.; "Tight bounds for Algebraic Gossip on Graphs;" Proc. of the IEEE International Symposium on Information Theory (ISIT); Jun. 13-18, 2010; 14 pages.

Borst, et al.; "Distributed Caching Algorithms for Content Distribution Networks;" IEEE INFOCOM; 2010 Proceedings IEEE; Mar. 14-19, 2010, 9 pages.

Borst et al.; "Distributed Caching Alorgorithms for Content Distribution Networks;" Power Point Presentation; BCAM Seminar; Bilbao, Sep. 30, 2010; 36 pages.

Bui, et al.; "A Markovian Approach to Multipath Data Transfer in Overlay Networks;" IEEE Transactions on Parallel and Distributed Systems; vol. 21; No. 10; Oct. 2010; pp. 1398-1411.

Cai, et al.; "Secure Network Coding;" IEEE, ISIT; Jun. 30-Jul. 5, 202; p. 323.

Calmon, et al.; "Network Coding Over Multiple Network Interfaces Using TCP;" Presentation; Information Theory and Applications Workshop (ITA) 2012; San Diego, CA; Feb. 5, 2012; 55 pages.

Cardinal, et al; "Minimum Entrophy Combinational Optimization Problems;" Data Structure and Algorithms, Discrete Mathematics; Aug. 17, 2010; pp. 1-16.

Castro, et al.; "Upper and Lower Error Bounds for Active Learning;" The 44'th Annual Allerton Conference on Communication, Control and Computing; vol. 2, No. 2.1; 2006, 10 pages.

Celik, et al.; "MAC for Networks with Multipacket Reception Capability and Spatially Distributed Nodes;" Proc. IEEE INFOCOM 2008; Apr. 2008; 9 pages.

Celik; "Distributed MAC Protocol for Networks with Multipacket Reception Capability and Spatially Distributed Nodes;" Master's Thesis; MIT Department of Electrical Engineering and Computer Science; May 2007; 127 pages.

Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.

Chakrabarti, et al.; Approximation Algorithms for the Unsplittable Flow Problem; Algorithmica (2007); Springer Science—Business Media, Aug. 2006; 16 pages.

Charikar, et al.; "Approximation Algorithms for Directed Steiner Problems;" Proceedings of the $9^{th}$ ACM-SIAM Symposium on Discrete Algorithms, pp. 1-15; 1998.

Chen, et al.; "Pipeline Network Coding for Multicast Streams;" ICMU Org.; 2010; 7 pages.

Chou, et al.; "FEC and Pseudo-ARQ for Receiver-driven Layered Multicat of Audio and Video;" Data Compression Conference (DCC), 2000; Proceedings; Jan. 2000, 10 pages.

Chou, et al.; "Practical Network Coding;" Proceedings of the $41^{st}$ Annual Allerton Conference on Communication, Control, and Computing; Oct. 2003; 10 pages.

Cisco Visual Networking Index: Forecast and Methodology; 2009-2014; White Paper; Jun. 2, 2010; pp. 1-17.

Cloud, et al.; "Co-Designing Multi-Packet Reception, Network Coding, and MAC Using a Simple Predictive Model;" arXiv:1101.5779v1 [cs.Nl]; Submitted to W.Opt 2011;Jan. 30, 2011; pp. 1-8.

Cloud, et al.; "Effects of MAC approaches on non-monotonic saturation with COPE—a simple case study;" Military Communication Conference, 2011—MILCOM; Aug. 11, 2011; 7 pages.

Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012, pp. 1-8.

Cloud, et al.; "Multi-Path TCP with Network Coding;" Wireless@mit—MIT Center for Wireless Networks and Mobile Computing; 2012 Inaugural Retreat; Oct. 10-11, 2012.

Cloud, et al; U.S. Appl. No. 13/654,953, filed Oct. 18, 2012.

Costa, et al.; "Informed Network Coding for Minimum Decoding Delay;" Fifth IEEE International Conference on Mobile Ad-hoc and Sensor Systems; Sep. 2008; pp. 80-91.

Coughlin, et al.; Years of Destiny; HDD Capital Spending and Technology Developments from 2012-2016; IEEE Santa Clara Valley Magnetics Society; Jun. 19, 2012; pp. 1-28.

Dana, et al.; "Capacity of Wireless Erasure Networks;" IEEE Transactions on Information Theory; vol. 52; No. 3; Mar. 2006; pp. 789-804.

Dana, et al.; "Capacity of Wireless Erasure Networks;" Jan. 2008; 41 pages.

Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.

Deb, et al.; "On Random Network Coding Based Information Dissemination;" Proc. of the IEEE International Symposium on Information Theory (ISIT); Sep. 4-9; 2005; 5 pages.

Demers, et al.; "Epidemic Algorithms for Replicated Database Maintenance;" PODC '87 Proceedings of the sixth annual ACM Symposium on Principles of distributed computing; Jan. 1987; pp. 1-12.

Dias, et al., "Performance Analysis of HARQ in WiMax Networks Considering Imperfect Channel Estimation;" The $7^{th}$ International Telecommunications Symposium (ITS 2010); 2010; 5 pages.

Dimakis, et al.; "A Survey on Network Codes for Distributed Storage;" Proceedings of the IEEE; vol. 99; No. 3; Mar. 2011; pp. 476-489.

Dimakis, et al.; "Network Coding for Distributed Storage Systems;" IEEE/ACM Transactions on Information Theory; vol. 56; No. 9; pp. 1-13.

Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.

Effros; Distortion-Rate Bounds for Fixed- and Variable-Rate Multiresolution Source Codes; IEEE Transactions on Information Theory; vol. 45, No. 6; Sep. 1999; pp. 1887-1910.

Effros; "Universal Multiresolution Source Codes;" IEEE Transactions on Information Theory; vol. 47; No. 6; Sep. 2001; pp. 2113-2129.

El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.

Eryilmaz, et al.; On Delay Performance Gains From Network Coding; Information Sciences and Systems; 2006 $40^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling:" Communication, Control, and Computing: 2010; $48^{th}$ Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" $47^{th}$ Annual Allerton Conference, IEEE; Sep. 30, 2009; pp. 447-454.

(56) References Cited

OTHER PUBLICATIONS

Feizi, et al; "Cases Where Finding a Minimum Entrophy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Nework Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The $27^{th}$ Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control, vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "Zigzag Decoding: Combating Hidden Terminals in Wireless Networks;" SIGCOMM 08; Aug. 17-22; pp. 159-170
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Network Coding Gossip Made Easyl" Proc. of the $43^{rd}$ Symposium on Theory of Computing (STOC); Jan. 2011, 13 pages.
Haeupler, et al.; "Optimality of Network Coding in Packet Networks;" ArXiv, Feb. 17, 2011; 5 pages.
Haley, et. al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Nework Coding for Security" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective:" ISIT; Jun.-Jul. 2003; 6 pages.
Ho, et al.; "On Randomized Network Coding;" Proceedings of $41^{st}$ Annual Allerton Conference on Communications, Control and Computing; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.

(56) References Cited

OTHER PUBLICATIONS

Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in the Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et. al.; "Modeling Network Coded TCP Throughput: A Simple Model and its Validation", arXiv: 1008.0420v1 [cs.IT] Aug. 2, 2010; 9 pages.
Kim, et. al.; "Modeling Network Coded TCP Throughput: A Simple Model and its Validation", Nov. 2010, Presentation; 19 pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;" Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{nd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972 pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE $63^{rd}$; vol. 4; May 7-10, 2006; pp. 2052-2057.
Larsson; "Analysis of Multi-User ARQ with Multiple Unicast Flows Under Non-lid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le et al.; "How Many Packets Can We Encode?—An Analysis of Practical Wireless Network Coding;" Infocom 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li, et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast," Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland; Conference: NetCod 2009, Lausanne, Switzerland; Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On Coding for Delay New Appoaches based on Network Coding in Networks with Large Latency;" Conference ITA Workshop, San Diego, USA; Slide Presentation; Feb. 13, 2009; 11 pages.
Lucani et al; "Random Linear Network Coding For Time-Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 2009; 6 pages.
Lucani et al; "Random Linear Network Coding for Time-Division Duplexing: when to stop talking and start listening;" Presentation in INFOCOM: Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding for Data Dissemination: It Is Not What You Know, But What Your Neighbors Don't Know;" Modeling and Optimization in Mobile, AdHoc, and Wireless Networks 2009; WiOPT 2009; $7^{th}$ International Symposium on Jun. 23-27, 2009; pp. 1-8.
Lucani, et al.; "Network Coding Schemes for Underwater Networks;" WUWNet 07: Sep. 14, 2007; pp. 25-32.

(56) References Cited

OTHER PUBLICATIONS

Lucani, et al.; Systematic Network Coding for Time-Division Duplexing; Proceedings of the IEEE International Symposium on Information Theory (ISIT); ; Jun. 13-18, 2010; pp. 2403-2407.

Lun, et al.; "Further Results on Coding for Reliabie Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation: Massachusetts Institute of Technology; Jun. 2006; 130 pages.

Magli, et al.; "An Overview of Network Coding for Multimedia Streaming;" IEEE International Conference; Jun. 28, 2008; pp. 1488-1491.

Mallat, et al.; "Adaptive Covariance Estimation of Locally Stationary Processes;" Annals of Statistics, vol. 26, No. 1; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the $44^{th}$ Allerton Conference on Communication, Control, and Computing; Sep. 2006; 10 pages.

Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "information Dissemination via Network Coding;" ISIT 2006; IEEE; Jul. 9-14, 2006; pp. 1748-1752.

Moyer, et al.; "A Survey of Security Issues in Multicast Communications;" IEEE Network; vol. 13; No. 6; Nov./Dec. 1999; pp. 12-23.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59, Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira et al.; "A Network Coding Approach to Secret Key Distribution;" IEEE Transactions on Information Forensics and Security; vol. 3; No. 3; pp. 414-423; Sep. 2008.

ParandehGheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003, 14 pages.

Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.

Radunovic, et al.; "Horizon: Balancing TCP Over Muitipie Paths in Wireless Mesh Network;" Proc. $14^{th}$ ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at the 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et.al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10: Modelling and Optimization in Mobile, Ad Hoc, and Wire Networks; Jul. 13, 2010; pp. 374-379.

Roughgarden, et al.; "How Bad is Selfish Routing?" Journal of the ACM; vol. 49, No. 2; Mar. 2002; pp. 236-259.

Ruemmler, et al., "An Introduction to disk drive modeling;" IEEE Computers; vol. 27, No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al., "Polynomial Time Algorithms for Network Information Flow;" $15^{th}$ ACM Symposium on Parallel Algorithms and Architectures; Jun. 2003; pp. 1-9.

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless;" Packet Video; Nov. 2007; 10 pages.

Sengupta, et al.; "An Analysis of Wireless Network Coding for Unicast Sessions; The Case for Coding-Aware Routing;" in iNFOCOM 2007; $26^{th}$ IEEE International Conference on Computer Communications; Jun. 2007; 9 pages.

Servetto, et al.; "Constrained Random Walks on Random Graphs: Routing Algorithms for Large Scale Wireless Sensor Networks;" WSNA 02; Sep. 28, 2002; 10 pages.

Shenker, et al.; "Pricing in computer networks: reshaping the research agenda;" Telecommunications Policy; vol. 20, No. 3; Jan. 1998; pp. 183-201.

Sherali, et al.; "Recovery of primal solutions when using subgradient optimization methods to solve Lagrangian duals of linear programs;" Elsevier Operations Research Letters 19 (Jan. 1996); pp. 105-113.

(56) References Cited

OTHER PUBLICATIONS

Shields; "The Interactions Between Ergodic Theory and Information Theory;" IEEE Transactions on Information Theory, vol. 44, No. 6; Oct. 1998; pp. 2079-2093.

Shrader, et al.; "Systematic wireless network coding;" Military Conference, 2009; MILCOM 2009; IEEE; 7 pages.

Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.

Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al.; Performance analysis of joint chase combining and network coding in wireless broadcast retransmission; Wireless Communication, Network and Mobile Computing 2008; WiCOM '08, 4$^{th}$ International Conference on Oct. 12-14, 2008; pp. 1-4.

Soo Suh; "Send-On-Delta Sensor Data Transmission With a Linear Predictor;" Sensors; ISSN 1424-8220; vol. 7; No. 4; Apr. 26, 2007; pp. 537-547.

Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.

Sundaram; et al.; "Multirate Media Streaming Using Network Coding;" Proc. 43$^{rd}$ Allerton Conference on Communication, Control, and Computing; Sep. 2005; 7 pages.

Sundararajan, et al.; "ARQ for Network Coding;" ISIT Proc. of the IEEE International Symposium on Information Theory (ISIT); Jul. 6-11, 2008; pp. 1651-1655.

Sundararajan, et al.; "Network Coding Meets TCP: Theory and Implementation;" Proceedings of the IEEE; vol. 99, Issue 3; Mar. 2011; pp. 490-512.

Sundararajan, et al.; "Network coding meets TCP;" InfoCOM 2009; IEEE, Apr. 19-25, 2009; pp. 280-288.

Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.

Teerapittayanon, et al.; "Network Coding as a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generation Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; 7$^{th}$ International ITG Conference on Jan. 14-16, 2008; 6 pages.

Tosun, et al.; "Efficient Multi-Layer Coding and Encryption of MPEG Video Streams;" Proc. 2000 IEEE International Conference on Multimedia and Expo; vol. 1; 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 685-698.

Tran, et al.; "A Joint Network-Channel Coding Technique for Single-Hop Wireless Networks," Network Coding, Theory and Applications; 2008; NetCod 2008; Fourth Workshop on Jan. 3-4, 2008; pp. 1-6.

Trung, et al.; "Quality Enhancement for Motion JPEG Using Temporal Redundancies;" IEEE Transactions on Circuits and System for Video Technology, vol. 18; No. 5; May 2008; pp. 609-619.

Tsatsanis, et al., "Network Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. 5$^{th}$ International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

Velambi, et al.; "Throughput and Latency in Finite-Buffer Line Networks;" IEEE Transactions on Information Theory; vol. 57; No. 6; Jun. 2011; pp. 3622-3643.

Vien, al.; "Network Coding-based Block ACK for Wireless Relay Networks;" Proceedings of IEEE Vehicular Technology Conference (VTC2011-Spring); May 2011; 5 pages.

Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.

Vilela, et al., "Lightweight Security for Network Coding;" IEEE International Conference on Communications; May 2008; 5 pages.

Wang, et al.; "Capacity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Multiple Packet Reception;" in INFOCOM 2008; The 27$^{th}$ Conference on Computer Communications; IEEE; Apr. 2008; pp. 1517-1525.

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.

Widmer, et al.; "Network Coding for Efficient Communication in Extreme Networks;" Applications, Technologies, Architectures, and Protocols for Computer Communication; Aug. 2005; pp. 284-291.

Wieselthier, et al.; "Energy Efficient Broadcast and Multicast Trees in Wireless Networks;" Mobile Networks and Applications 7; Jan. 2002; pp. 481-492.

Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.

Wilhelm: "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2008; pp. 768-772.

Yazdi, et al.; "Optimum Network Coding for Delay Sensitive Applications in WiMAX Unicast;" IEEE INFOCOM 2009; Apr. 19-25, 2009; pp. 1576-2580.

Yeung; "Multilevel Diversity Coding with Distortion," IEEE Transactions on Information Theory; vol. 41, No. 2; Mar. 1995; pp. 412-422.

Yong, et al.; "XOR Retransmission in Multicast Error Recovery;" Networks 2000; ICON; Proceedings IEEE International Conference on Sep. 5-8, 2000; pp. 336-340.

Yun, et al.; "High-Throughput Random Access Using Successive Interference Cancellation in a Tree Algorithm;" IEEE Transactions on Information Theory; vol. 53; No. 12; Dec. 2007; pp. 4628-4639.

Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.

Zeger; "Packet Erasure Coding with Random Access to Reduce Losses of Delay Sensitive Multislot Messages;" IEEE; Paper ID #900482; Aug. 18, 2009; pp. 1-8.

Zhang, et al., "Collision Resolution in Packet Radio Networks Using Rotational Invariance Techniques;" IEEE Transactions on Communication; vol. 50; No. 1; Jan. 2002; pp. 146-155.

(56) References Cited

OTHER PUBLICATIONS

Zhang, et al.; "Optimized Multipath Network Coding in Loss Wireless Networks;" ICDCS '08 Proceedings of the 2008 The 28th International Conference on Distributing Computing Systems; Jan. 2008; 12 pages.
Zhang et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
Response to Office Action dated Sep. 19, 2013 as filed or Dec. 11, 2013 for U.S. Appl. No. 13/291,310.
Notice of Allowance dated Mar. 20, 2014 from U.S. Appl. No. 13/291,310, filed Nov. 8, 2011.
U.S. Appl. No. 14/297,090, filed Jun. 5, 2014, Kim, et al.
U.S. Appl. No. 14/678,359, filed Apr. 3, 2015, Zeger, et al.
U.S. Appl. No. 14/668,185, filed Mar. 25, 2015, Medard, et al.
Chen, et al.; "Pipeline Network Coding for Multicast Streams;" ICMU Org.; 2010 7 pages.
Chou, et al.; "Practical Network Coding;" 2003 Proceedings of Allerton Conference on Communication, Control, and Computing; Oct. 2003; 10 pages.
Eryilmaz, et al.; On Delay Performance Gains From Network Coding; Information Sciences and Systems; 2006 40th Annual Conference on Mar. 22-24, 2006; pp. 864-870.
Ho, et al.; "The Benefits of Coding Over Routing in a Randomized Setting;" ISIT 2003; Yokohama, Japan; IEEE; Jun. 29-Jul. 4, 2003; p. 442.
Jin, et al.; "Adaptive Random Network Coding in WiMAX;" Communications, 2008; ICC'08 IEEE International Conference on May 19-23, 2008; pp. 2576-2580.
Li, et al.; "Is Random Network Coding Helpful in WiMAX?" Infocom 2008; The 27th Conference on Computer Communications; IEEE; Apr. 13-18, 2008; 5 pages.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference, 2008; WCNC 2008; IEEE; Mar. 31-Apr. 3, 2008; pp. 1985-1990.
Larsson, et al.; "Multi-User ARQ;" Vehicular Technology Conference; 2006; VTC (2006-Spring); IEEE 63rd; vol. 4, May 7-10, 2006; pp. 2052-2057.
Lucani, et al.; "Network Coding for Data Dissemination: It Is Not What You Know, but What Your Neightbors Don't Know;" Modeling and Optimization in Mobile, AdHoc, and Wireless Networks 2009; WiOPT 2009; 7th International Symposium on Jun. 23-27, 2009; pp. 1-8.
Lun, et al.; "Further Results on Coding for Reliabie Communication over Packet Networks;" Information Theory, ISIT 2005 Proceedings International Symposium on Sep. 4-9, 2005; pp. 1848-1852.
Manssour, et al.; "A Unicast Retransmission Scheme based on Network Coding;" IEEE Transactions on Vehicular Technology; vol. 61; Issue 2; pp. 871-876.
Medard, et al.; "Systematic Network Coding for Time-Division Duplexing;" Proceedings of the IEEE International Symposium on Information Theory (ISIT); ; Jun. 13-18, 2010; pp. 2403-2407.
Pu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4.
Qureshi, et al.; "An Efficient Network Coding based Retransmission Algorithm for Wireless Multicast;" Personal, Indoor and Mobile Radio Communications, 2009 IEEE 20th International Symposium on Sep. 13-16, 209; pp. 691-695.
Sundararajan, et al.; "ARQ for Network Coding;" Information Theory; ISIT 2008; IEEE International Symposium on Jul. 6-11, 2008, pp. 1651-1655.
Sundararajan, et al.; "Network Coding Meets TCP: Theory and Implementation;" Proceedings of the IEEE; vol. 99, Mar. 2011; pp. 490-512.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; pp. 180-184.
Yun, et al.; Towards Zero Retransmission Overhead: A Symbol Level Network Coding Approach to Retransmission; IEEE Transactions on Mobile Computing; vol. 10; No. 6; Aug. 2011; pp. 1083-1095.
Ford, et al. "TCP Extension for Multipath Operation with Multiple Addresses;" Internet draft, draft-ford-mptcp-multiaddressed-03; Work in Progress, Mar. 2010; pp. 1-36.
U.S. Pat. No. 7,706,365 filed on Nov. 17, 2004.
Kim, et. al.; "Modeling Network Coded TCP Throughput: A Simple Model and its Validation", Conference paper published May 2012, 10 pages.
Kim, et al.; "Modeling Network Coded TCP Throughput: A Simple Model and its Validation", Nov. 2010, 19 pages.
Nguyen, et al; "Video Streaming with Network Coding;" Journal of Signal Processing Systems; vol. 59, Issue 3; DOI: 10.1007/s11265-009-0342-7; Jun. 2010; p. 319-333.
Application of Medard, et al.; "Wireless Reliability Architecture and Methods Using Network Coding;" U.S. Appl. No. 14/013,324, filed Aug. 29, 2013; 36 pages.
Application of Medard, et al.; "Wireless Reliability Architecture and Methods Using Network Coding;" U.S. Appl. No. 14/013,330, filed Aug. 29, 2013; 37 pages.
U.S. Appl. No. 13/291,310, filed Nov. 8, 2011.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "On Coding for Delay New Approaches Based on Network Coding in Networks with Large Latency;" Conference ITA Workshop, San Diego, USA; Slide Presentation; Feb. 13, 2009; 12 pages.
Lucani et al; "Random Linear Network Coding for Time-Division Duplexing: when to stop talking and start listening;" Presentation in ICC; Slide Presentation; Jun. 16, 2009; 6 pages.
Lucani et al.; "On Coding for Delay New Appoaches based on Network Coding in Network Coding in Networks with Large Latency;" Presentation in NetCod; Slide Presentation; Jun. 16, 2009; 17 pages.
PCT Search Report of the ISA for PCT/US2009/055359 dated Mar. 30, 2011.
Written Opinion of the ISA for PCT/US2009/055359 dated Mar. 30, 2011.
International Preliminary Report on Patentability of the ISA for PCT/US2009/055359 dated Apr. 21, 2011.
U.S. Pat. No. 8,279,781 issued on Oct. 2, 2012.
U.S. Pat. No. 8,451,756 issued on May 28, 2013.
U.S. Appl. No. 13/654,953, filed Oct. 18, 2012, Zeger, et al.
U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
Office Action dated Jul. 9, 2015 for U.S. Appl. No. 14/013,324.
Office Action dated Jul. 10, 2015 for U.S. Appl. No. 14/013,330.

* cited by examiner

WIRELESS RELIABILITY ARCHITECTURE AND METHODS USING NETWORK CODING

CROSS REFERENCE TO RELATED APPLICATION

The present application claims the benefit of U.S. Provisional Patent Application No. 61/791,321 filed on Mar. 15, 2013, which is incorporated by reference herein in its entirety.

GOVERNMENT RIGHTS

This invention was made with government support under Contract Nos. FA9550-09-1-0196 and FA9550-08-1-0159 awarded by the Air Force Office of Scientific Research, under Contract No. N66001-11-C-4003 awarded by the Space and Naval Warfare Systems Command, and under Contract No. HR0011-10-3-0002 awarded by the Defense Advanced Research Projects Agency. The government has certain rights in the invention.

FIELD

Subject matter disclosed herein relates generally to wireless communication and, more particularly, to techniques, systems, and devices for providing reliability within wireless systems.

BACKGROUND

The growing market for mobile devices is placing increasing demands on wireless networks. Indeed, at the end of 2009, the number of mobile phone subscribers exceeded 4.6 billion worldwide, and the global mobile data traffic has been predicted to double every year through 2014. As a result, a crucial challenge for next generation wireless networks is to cope with the rapid increase in multimedia traffic with minimal impact on equipment complexity.

The $4^{th}$ generation (4G) wireless standards require stationary speeds of 1 giga bits-per-second (Gbps) and mobile speeds of 100 mega bits-per-second (Mbps), while the third generation (3G) standards only required stationary speeds of 2 Mbps and mobile speeds of 384 kilo bits-per-second (Kbps). That is, 4G requires 500 and 260 times faster speeds than 3G in the stationary and mobile cases, respectively. Thus, the need for low-cost performance-multiplying technologies is expected to become significant for wireless networks in the near future.

Techniques are therefore needed for providing fast, efficient, and reliable data transfer operations that are suitable for use in high traffic wireless networks and other systems.

SUMMARY

In accordance with one aspect of the concepts, systems, circuits, and techniques described herein, a method for use in providing reliable data transfer in a wireless network comprises: obtaining data elements associated with a data transfer operation between a first node and a remote second node; distributing the data elements among a plurality of encoder worker threads; and employing random linear network coding (RLNC) in the encoder worker threads to generate, for corresponding data elements, coded segments for transmission from the first node to the second node.

In one embodiment, the method further comprises: generating uncoded segments in at least one of the encoder worker threads for corresponding data elements; and transmitting the coded and uncoded segments from the first node to the second node for implementing systematic RLNC.

In one embodiment, obtaining data elements includes intercepting data elements at a predetermined point within a protocol stack.

In one embodiment, intercepting data elements includes intercepting internet protocol (IP) packets at an IP layer of the protocol stack.

In one embodiment, the method further comprises transmitting the coded segments from the first node to the second node, wherein transmitting the coded segments includes injecting the coded segments into the IP layer of the protocol stack.

In one embodiment, distributing the data elements among a plurality of encoder worker threads includes buffering the data elements, generating a plurality of buffer lists that each Includes one or more data elements, and distributing the buffer lists among the plurality of encoder worker threads.

In one embodiment, distributing the buffer lists includes distributing the buffer lists to the encoder worker threads in a round robin fashion.

In one embodiment, generating a plurality of buffer lists includes, for each successive buffer list: acquiring a new data element; adding the new data element to a current buffer list; and repeating acquiring and adding until a maximum buffer list processing time has been reached or the maximum buffer list size has been reached.

In one embodiment, the method further comprises: concatenating data elements distributed to a first encoder worker thread to form a first coding block; and segmenting the first coding block into segments having a first segment size, wherein segmenting includes padding the first coding block if a size of the first coding block is not a multiple of the first segment size; wherein employing random linear network coding includes: (a) generating random coefficients for the segments; and (b) linearly combining the segments using the random coefficients to generate a first coded segment in the first encoder worker thread.

In one embodiment, employing random linear network coding further includes repeating generating and linearly combining to generate other coded segments in the first encoder worker thread until a predetermined number of coded segments has been generated or an acknowledgement message has been received from a corresponding processing thread in the second node.

In one embodiment, the method further comprises determining, before segmenting the first coding block, a segment length and a number of segments to use in performing random linear network coding for the first coding block, wherein the determining of the segment length and is based at least in part on a length of the first coding block.

In one embodiment, the method further comprises adding a header to the first coded segment.

In one embodiment, the header includes a thread identifier (TID) to identify a thread associated with the first coded segment.

In one embodiment, the header includes a block identifier (BID) to identify a coding block associated with the first coded segment.

In one embodiment, the header includes a segment identifier (SID) to distinguish the first coded segment from other coded segments generated by the first encoder worker thread.

In one embodiment, the header includes an indication of a number of segments used to generate the first coded segment.

In one embodiment, the header includes an indication of the coding coefficients used to generate the first coded segment.

In one embodiment, the indication of the coding coefficients used to generate the coded segment includes a seed of a random number generator used to generate the coding coefficients.

In one embodiment, the method further comprises adjusting at least one of: a number of coded segments to transmit to the second node, a number of segments in a coding block, a length of segments in a coding block, a number of coded segments within a transmission round, and a maximum number of coded segment transmission rounds, based at least in part on channel-related Information.

In one embodiment, the channel-related information includes at least one of: channel estimates generated within the first node and feedback information received from the second node.

In one embodiment, the encoder worker threads are Implemented in the first node.

In one embodiment, the encoder worker threads are Implemented at a location outside the first node.

In one embodiment, the first node is a relay node and obtaining data elements includes receiving coded packets at the relay node; and employing RLNC in the encoder worker threads includes re-coding the coded packets using RLNC.

In one embodiment, the method further comprises: initiating a new encoder worker thread at the relay node for each received packet having a thread identifier (TID) that was previously unknown to the relay node; performing re-coding among packets of the same block; repeating re-coding in the relay node's encoder worker thread within each block, upon each new packet reception, or until a predetermined number of coded packets has been generated or an acknowledgement message has been received from a corresponding processing thread in the second node; and ceasing transmission of coded packets for any given block and sending an acknowledgement upstream to the next transmitting node upon receiving an acknowledgement for the block.

In one embodiment, the method is performed in coordination with one or more physical layer reliability enhancement mechanisms.

In one embodiment, the first and second nodes are part of a wireless municipal area network.

In accordance with another aspect of the concepts, systems, circuits, and techniques described herein, a communication device comprises: a wireless transceiver; and one or more processors configured to: obtain data elements associated with a data transfer operation between the communication device and a remote node; and distribute the data elements among a plurality of encoder worker threads that are each configured to use random linear network coding (RLNC) to generate coded segments for corresponding data elements.

In one embodiment, the one or more processors are configured to: (a) cause uncoded segments to be generated in at least one of the encoder worker threads for corresponding data elements; and transmit the coded and uncoded segments to the destination node via the transceiver to implement systematic RLNC.

In one embodiment, the one or more processors are configured to obtain the data elements by intercepting the data elements at a predetermined point within a protocol stack of the communication device.

In one embodiment, the data elements are internet protocol (IP) packets and the one or more processors include a netfilter to intercept IP packets at an IP layer of the protocol stack of the communication device.

In one embodiment, to generate a buffer list, the one or more processors are configured to: acquire a new data element; add the new data element to a current buffer list; and repeat the acquisition and addition of new data elements until a maximum buffer list processing time or a maximum buffer list size is reached.

In one embodiment, a first of the encoder worker threads is configured to: concatenate corresponding data elements to form a first coding block; segment the first coding block into segments having a first segment size, wherein segmenting includes padding the first coding block if a size of the coding block is not a multiple of the first segment size; generate random coefficients for the segments; and linearly combine the segments using the random coefficients to generate a first coded segment.

In one embodiment, the first encoder worker thread is configured to generate additional random coefficients for the segments and linearly combine the segments using the additional random coefficients to generate additional coded segments.

In one embodiment, the first encoder worker thread is configured to generate additional coded segments until a predetermined number of coded segments have been generated or an acknowledgement message is received from a corresponding processing thread in the destination node.

In one embodiment, the first encoder worker thread is configured to generate coded segments in rounds, wherein $N_m$ coded segments are generated per round and a nominal delay of $T_r$ exists between rounds.

In one embodiment, the first encoder worker thread is configured to not exceed a maximum number $N_k$ of rounds.

In one embodiment, the first encoder worker thread is configured to determine, before segmenting the first coding block, a segment length and a number of segments to use for random linear network coding for the first coding block based at least in part on a length of the first coding block.

In accordance with a still another aspect of the concepts, systems, circuits, and techniques described herein, a method for use in providing reliable data transfer in a wireless network comprises: receiving coded segments from a remote wireless node, each coded segment being associated with a specific coding thread and being coded with a random linear network code (RLNC); reading thread identifiers within the received coded segments and directing the coded segments to corresponding decoder worker threads based thereon, each decoder worker thread having a corresponding encoder worker thread associated with the remote wireless node; and using the coded segments within the corresponding decoder worker threads to recover original data elements.

In one embodiment, the method further comprises: receiving uncoded segments from the remote wireless node, each uncoded segment being associated with a specific coding thread; and reading thread identifiers within the received uncoded segments and directing the uncoded segments to corresponding decoder worker threads based thereon; wherein using the coded segments within the corresponding decoder worker threads to recover original data elements includes using the coded segments as redundant information to the uncoded segments within the decoder worker threads to recover the original data elements using systematic RLNC.

In one embodiment, the uncoded segments are received before the corresponding coded segments for each decoder worker thread.

In one embodiment, the coded segments for each decoder worker thread are received in rounds, with $N_m$ coded segments per round and a nominal delay of $T_r$ between rounds.

In one embodiment, the method further comprises sending an acknowledgement (ACK) message from a decoder worker thread to a corresponding encoder worker thread associated with the remote wireless node in response to recovery of all original data elements associated with corresponding segments.

In one embodiment, using the coded segments within the corresponding decoder worker threads to recover original data elements includes performing a Gauss-Jordan elimination operation for each new coded segment.

In one embodiment, using the coded segments within the corresponding decoder worker threads to recover original packets comprises: recovering a corresponding coding block within a first decoder worker thread; removing padding from the coding block, if any, within the first decoder worker thread; and separating the coding block into original data elements.

In one embodiment, the method further comprises delivering the original data elements recovered by the decoder worker threads to a corresponding application.

In accordance with a further aspect of the concepts, systems, circuits, and techniques described herein, a communication device comprises: a wireless transceiver; and one or more processors to: receive coded segments from a remote wireless node, each coded segment being associated with a specific coding thread and being coded with a random linear network code (RLNC); read thread identifiers within the received coded segments and direct the coded segments to corresponding decoder worker threads based thereon, each decoder worker thread having a corresponding encoder worker thread that is associated with the remote wireless node; and use the coded segments within the corresponding decoder worker threads to recover original data elements.

In one embodiment, the one or more processors are configured to: receive uncoded segments from the remote wireless node, each uncoded segment being associated with a specific coding thread; read thread identifiers within the received uncoded segments and direct the uncoded segments to corresponding decoder worker threads based thereon; and use the coded segments as redundant information to the uncoded segments to recover the original data elements within the decoder worker threads, using systematic RLNC.

In one embodiment, each decoder worker thread is configured to send an acknowledgement (ACK) message to a corresponding encoder worker thread associated with the remote wireless node in response to recovery of all original data elements associated with the decoder worker thread.

In one embodiment, each decoder worker thread is configured to perform a Gauss-Jordan elimination operation when a new coded segment is received.

In accordance with a still further aspect of the concepts, systems, circuits, and techniques described herein, a method for use in a wireless system, comprises: transmitting systematic packets to a remote node; and transmitting one or more nonsystematic packets to the remote node, the non-systematic packets being encoded with a random linear network code (RLNC), the nonsystematic packets to serve as redundant information to the systematic packets for implementing systematic RLNC.

In one embodiment, transmitting one or more nonsystematic packets to the remote device Includes transmitting the one or more nonsystematic packets to the remote device in successive rounds, each round having $N_m$ packets.

In one embodiment, transmitting the one or more nonsystematic packets to the remote device in successive rounds includes transmitting the packets with a nominal inter-round delay of $T_r$.

In one embodiment, the method further comprises: before transmitting the systematic packets, generating the systematic packets, at least in part, within a plurality of encoder threads, each systematic packet including a thread identifier (TID) to identify a corresponding encoder thread; and before transmitting the nonsystematic packets, generating the nonsystematic packets, at least in part, within the plurality of encoder threads, each nonsystematic packet including a thread identifier (TID) to identify a corresponding encoder thread.

In one embodiment, generating the nonsystematic packets includes: obtaining a coding block within a first encoder thread; segmenting the coding block into a number of segments; generating first random coefficients for the segments; and linearly combining the segments using the first random coefficients to generate a first nonsystematic segment.

In accordance with yet another aspect of the concepts, systems, circuits, and techniques described herein, a method for use in a wireless system, comprises: obtaining a coding block; segmenting the coding block into a number of equal-length uncoded segments; generating one or more coded segments by applying random linear network coding (RLNC) to the number of equal-length segments; and transmitting the uncoded segments and the one or more coded segments to a remote node, the one or more coded segments for use as redundant information by the remote node to recover one or more of the uncoded segments should they be erased in the wireless channel.

BRIEF DESCRIPTION OF THE DRAWINGS

The foregoing features may be more fully understood from the following description of the drawings in which.

DETAILED DESCRIPTION

Figure 1:
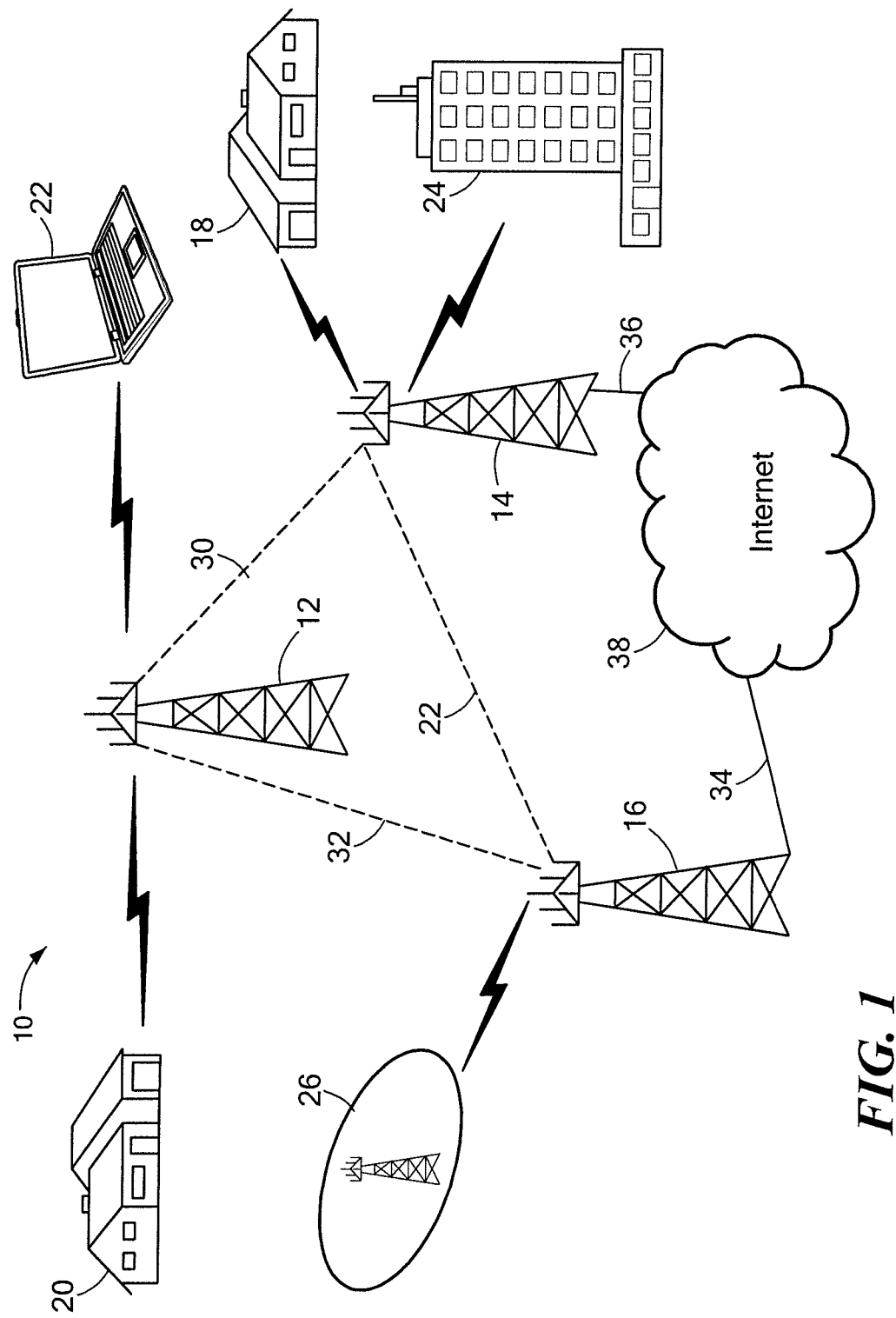
FIG. 1 is a diagram illustrating a wireless municipal area network (WMAN) that may incorporate features described herein.

The subject matter described herein relates to techniques, devices, systems, circuits, and concepts for use in implementing network coding (or other similar coding techniques) within wireless systems in a manner that can enhance data transfer reliability and efficiency. The techniques, devices, systems, circuits, and concepts may be used in any of a wide variety of different types of wireless systems and networks. In some implementations, for example, the techniques are used within wireless municipal area networks (WMANs), such as those that follow the IEEE 802.16 family of wireless networking standards or the Long Term Evolution (LTE) family of standards. It should be appreciated, however, that many other applications also exist.

In some embodiments described herein, network-coding-enabled reliability architectures are provided for next generation wireless networks. These network coding (NC) architectures may, in some implementations, use a flexible thread-based coding design. In addition, or alternatively, these architectures may utilize systematic intra-session random linear network coding (RLNC) as a packet erasure code to support fast and reliable information transfer between wireless nodes. The systematic RLNC coding and decoding may be performed within, for example, a number of coding/decoding threads that span the channel between a transmitter and a receiver. In at least one implementation, an architecture is provided that is able to decrease packet loss from around 11-32% to nearly 0% with respect to a network implementing HARQ and joint HARQ/ARQ mechanisms. Thus, the architecture is capable of achieving an increase in throughput by a factor of up to 5.9 and a reduction in end-to-end file transfer delay by a factor of up to 5.5. In some implementations, the protocols and architectures described herein may reduce or eliminate the need to use other reliability enhancement techniques within a system or network (e.g., ARQ and/or joint HARQ/ARQ schemes in the PHY/MAC layers, etc.).

In general, network coding may be applied across the OSI model. However, some layers may be better choices than others in different applications. For example, additional performance gains at the physical layer may be onerous, since existing coding schemes have achieved near-optimal efficiency levels in this layer. In contrast, network coding may yield important gains when integrated within the transport and MAC sub-layers. In the context of WMANs, transport and MAC functions are performed at the convergence and MAC sub-layers. The current context for higher Internet layers (i.e., TCP/IP) is extremely dynamic. This is essentially due to the sensitivity of TCP's congestion control to the variety of possible transmission environments (e.g., wireless, satellite, optical long-haul, etc.), leading to the emergence of a number of alternative competing transport protocols and enhancements. This trend is compounded by the emergence of IPv6. Network coding may therefore benefit from the continuity offered by industrial standards such as IEEE 802.16 (WiMAX) and LTE. In the context of WMANs, the application of network coding at the convergence sub-layer would serve all supported traffic and would be Independent of likely technology and protocol shifts at higher layers. Therefore, in some embodiments, network coding is applied at the convergence sub-layer (or at the edge between the IP layer and the convergence sub-layer), although other locations within a protocol stack are used in other embodiments.

FIG. 1 is a diagram Illustrating a wireless municipal area network (WMAN) 10 that may incorporate features described herein in one or more embodiments. The WMAN 10 may operate in accordance with one or more wireless networking standards such as, for example, the IEEE 802.16 wireless networking standard, the LTE advanced wireless standard, and/or others. As illustrated, the WMAN 10 may include one or more wireless base stations 12, 14, 16 to provide communication services to one or more wireless subscribers in a corresponding wireless coverage area. The base stations 12, 14, 16 may, for example, provide last mile services for one or more homes 18, 20 in the coverage area. The homes 18, 20 may each include internal or external customer premises equipment (CPE) to support wireless communication with one of more of the base stations 12, 14, 16. In some cases, the homes 18, 20 may include a separate internal wireless local area network (e.g., an IEEE 802.11 (WIFI) network or the like). Alternatively, one or more of the homes 18, 20 may include one or more user devices (e.g., a laptop, a smart phone, a desktop, etc.) that are capable of communicating directly with a base station of the WMAN 10.

The base stations 12, 14, 16 of WMAN 10 may also communicate with one or more mobile devices 22 or other mobile platforms within the coverage area. Likewise, the base stations 12, 14, 16 may communicate with one or more subscribers within an office building 24 or other structure. The base stations 12, 14, 16 may also be capable of communicating with one or more wireless hot spots 26 in a surrounding environment to provide access to the network for users within the hotspot coverage region. As is apparent, the number of different subscriber scenarios that are possible within WMAN 10 and other wireless MANs is large.

In addition to communicating with subscriber equipment, the base stations 12, 14, 16 may also be capable of directly communicating with one another via one or more direct line of sight (LOS) backhaul links 28, 30, 32 between base stations. Further, in some systems, the base stations 12, 14, 16 may also be coupled to one or more large external networks (e.g., the Internet 38, a public switched telephone network (PSTN), etc.) by one or more fixed back haul links 34, 36 or other links to provide corresponding services to subscribers.

As will be described in greater detail, in some embodiments, the techniques and features described herein may be used to enhance data transfer reliability and/or data transfer efficiency between nodes in a wireless MAN, such as WMAN 10 of FIG. 1. For example, with reference to FIG. 1, features described herein may be implemented within the base stations 12, 14, 16 of WMAN 10 and also within the various types of subscriber equipment that communicate with the base stations 12, 14, 16. As will be appreciated, the techniques and features described herein may also be implemented in other types of wireless networks and systems. The features and techniques described herein may be used in both single hop links and multi-hop links within a network.

Figure 2:
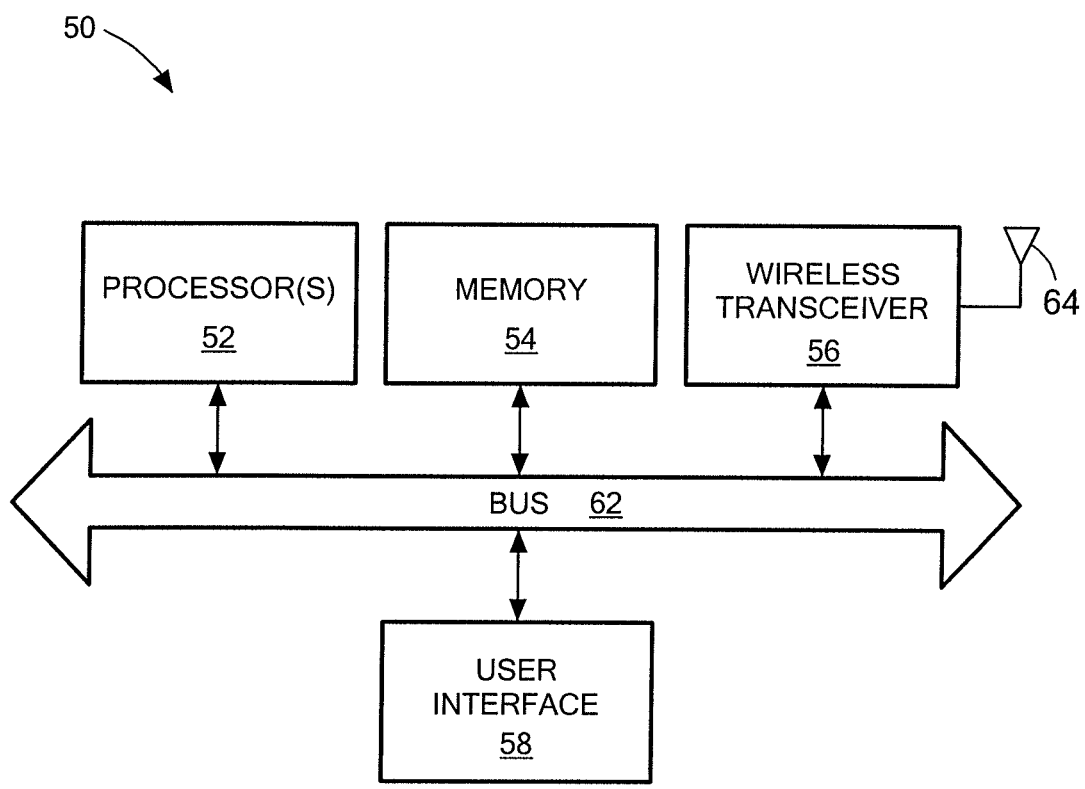
FIG. 2 is a block diagram illustrating an example node architecture that may be used within a communication device or node in accordance with an embodiment.

FIG. 2 is a block diagram illustrating an example node architecture 50 that may be used within a communication device or node in accordance with an embodiment. The architecture 50 may be used within, for example, a base station or subscriber equipment associated with a WMAN (e.g., WMAN 10 of FIG. 1, etc.) or node equipment within other wireless networks or systems. As illustrated, the node architecture 5d0 may include: one or more digital processors 52, a memory 54, a wireless transceiver 56, and a user interface 58. A bus 62 and/or other structure(s) may be provided for establishing interconnections between the various components of node architecture 50. Digital processor(s) 52 may include one or more digital processing devices that are capable of executing programs or procedures to provide functions and/or services for a user. Memory 54 may include one or more digital data storage systems, devices, and/or components that may be used to store data and/or programs for other elements of node architecture 50. Wireless transceiver 56 may include any type of transceiver that is capable of supporting wireless communication with one or more remote wireless entities. User interface 58 may include any type of device, component, or subsystem for providing an interface between a user and the corresponding node equipment.

Digital processor(s) 52 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), and/or other processing devices or systems, including combinations of the above. Digital processor(s) 52 may be used to, for example, execute an operating system for a corresponding node. Digital processor(s) 52 may also be used to, for example, execute one or more application programs for a node. In addition, digital processor(s) 52 may be used to implement, either partially or fully, one or more of the communications related processes or techniques described herein in some implementations.

As described above, wireless transceiver 56 may include any type of transceiver that is capable of supporting wireless communication with one or more remote wireless entities. Wireless transceiver 56 may include one or more digital processors for performing corresponding functions. Wireless transceiver 56 may be coupled to one or more antennas 64 and/or other transducers, to facilitate the transmission and/or reception of communication signals. In some embodiments, wireless transceiver 56 may be used to implement, either partially or fully, one or more of the communications related processes or techniques described herein. In some implementations, architecture 50 may also Include one or more wired transceivers (not shown).

In various implementations, wireless transceiver 56 may be configured in accordance with one or more wireless networking standards and/or wireless cellular standards. Multiple wireless transceivers may be used in some implementations to support operation in different networks or systems in a surrounding environment or with different wireless networking and/or cellular standards. Wireless transceiver 56 may, in some implementations, be capable of communicating with peer devices in a peer-to-peer, ad-hoc, or wireless mesh network arrangement. In addition, in some implementations, wireless transceiver 56 may be capable of communicating with a base station or access point of an infrastructure-type wireless communication scenario. In some instances, wireless transceiver 56 may be a base station transceiver that is capable of supporting multiple simultaneous wireless links with different subscriber equipment.

Memory 54 may include any type of system, device, or component, or combination thereof, that is capable of storing digital Information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

It should be appreciated that the node architecture 50 of FIG. 2 represents one possible example of a node architecture that may be used in an implementation. Other architectures may alternatively be used. As used herein, the terms "node device," "node," "communication device," and similar terms are used to describe any type of digital electronic device or system that includes some form of communication capability. This may include, for example, a laptop, desktop, notebook, or tablet computer; a personal digital assistant (PDA); a personal communication service (PCS) device; a personal navigation assistant (PNA); a cellular telephone, smart phone, or other handheld wireless communication device; a pager; a wireless sensor device; a satellite communication device; a media player having communication capability; a digital storage device with communication capability; CPE equipment; a set top box; wireless network interface cards (NICs) and other network interface structures; a wireless base station or wireless access point; an integrated circuit or system on chip (SOC) having communication functionality; and/or other devices, systems, or equipment. It should be appreciated that all or part of the various devices, systems, processes, or methods described herein may be implemented using any combination of hardware, firmware, and/or software.

Figure 3:
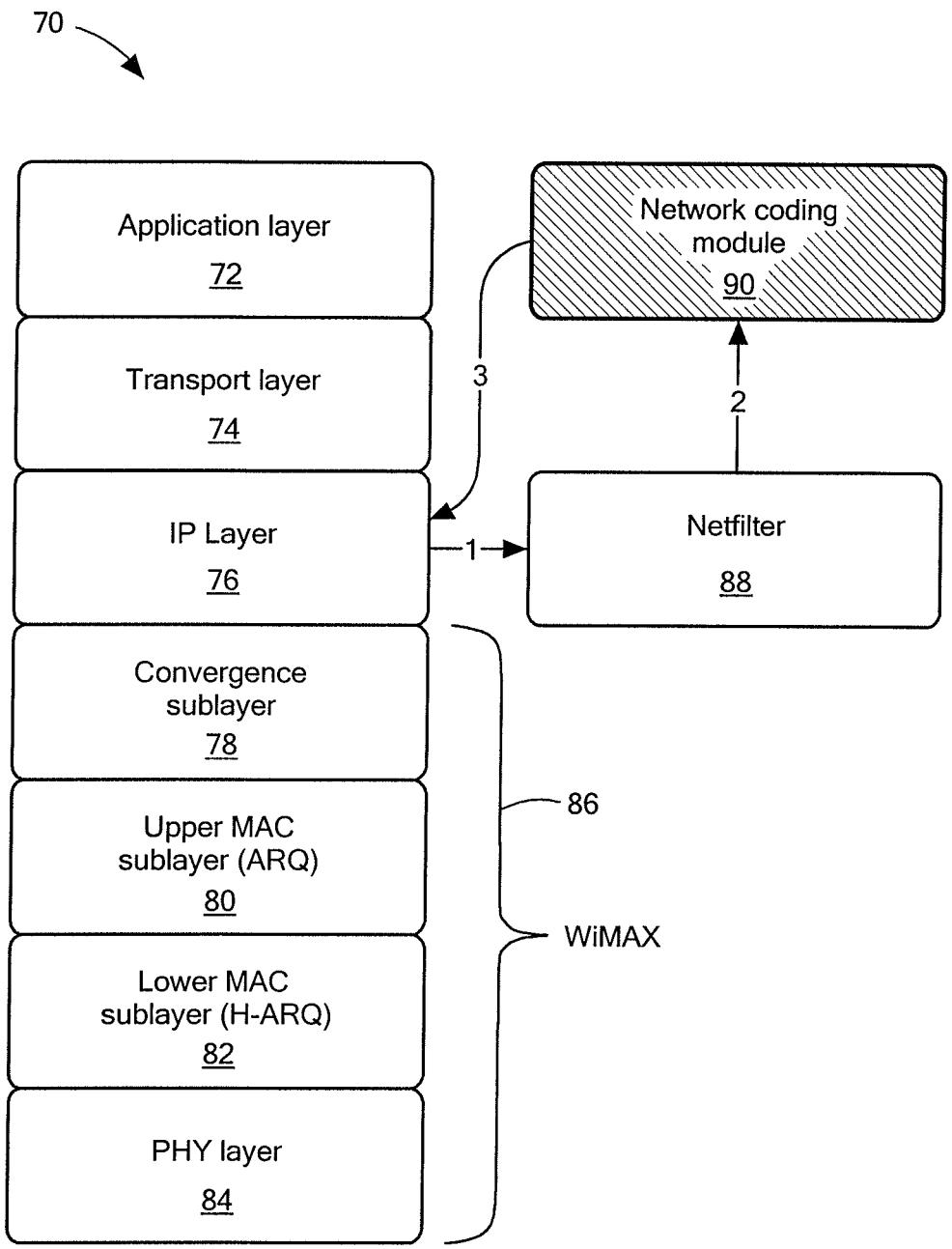
FIG. 3 is a diagram illustrating a modified protocol stack that may be implemented within a node in accordance with an embodiment.

FIG. 3 is a diagram illustrating a modified protocol stack 70 that may be implemented within a node to support a network coding based reliability architecture in accordance with an embodiment. If the node architecture of FIG. 2 is used for a node, protocol stack 70 may be implemented within, for example, the processor(s) 52 and/or the wireless transceiver 56 of the node. As shown in FIG. 3, the stack 70 may include, for example: an application layer 72, a transport layer 74, an internet protocol (IP) layer 76, a convergence sublayer 78, an upper medium access control (MAC) sublayer 80, a lower MAC sublayer 82, and a physical layer 84. The functions of these various layers are well known in the art and, therefore, will not be described herein. The lower layers 86 of the protocol stack 70 (e.g., the convergence sublayer 78, the upper and lower MAC sublayers 80, 82, and the physical layer 84) may be configured in accordance with a particular wireless networking standard (e.g., WiMAX, etc.). In at least one embodiment, modifications are made to protocol stack 70 to incorporate network coding into a corresponding wireless network or system. As will be described in greater detail, in some implementations, network coding may be added to a network in a manner that acts as a packet erasure code to support data transfer reliability and data transfer efficiency in the network.

In the embodiment of FIG. 3, network coding is applied at the IP layer 76 of the protocol stack 70. A Linux packet filtering framework (netfilter) 88 or other functionality may be used to intercept IP packets that are flowing downward through the stack 70 for use in applying network coding. As used herein, the terms "original packets" and "native packets" will be used to describe packets just before network coding is applied (i.e., the packets that will eventually be extracted in the receiver). The IP packets may be intercepted by netfilter 88 near, for example, the boundary between the IP layer 76 and the convergence sublayer 78 in one approach. A network coding module 90 may be provided to process the Intercepted packets to apply network coding. Processed packets, which may include both coded packets and uncoded packets, may then be injected back into protocol stack 70 by the network coding module 90 and allowed to flow downward toward physical layer 84 for transmission to a remote receiver. Similar processing may be performed in the reverse direction in the receiver device to recover the original data packets.

In some embodiments, the network coding module 90 may be implemented in user-space. The module 90 may act as an encoder at a source node (e.g., a base station, etc.) and as a decoder at a destination node (e.g., a subscriber station, etc.). At a source node, a source application located in user-space may send outgoing IP packets to an operating system (OS) where the transport and IP layers are run. The netfilter 88 (or other packet Interception functionality) can be used to intercept the IP packets and send them to the network coding module 90 in user-space. The network coding module 90 then returns coded IP packets or segments to the OS. Coded IP packets then traverse the WiMAX stack 86, passing through the convergence sublayer (CS) 78, the upper and lower MAC sublayers 80, 82, and the PHY layer 84. At the destination node, a netfilter may intercept the incoming coded IP packets handed from WiMAX to the OS and deliver them to a corresponding network coding module in user-space. The network coding module of the destination node may then send decoded packets (or original data packets) to the corresponding OS, which forwards the packets to the destination application. When using this NC-enhanced architecture, the ARQ and HARQ run from the upper and lower MAC sublayers, respectively, may be switched off.

As described above, in some embodiments, the network coding modules 90 within source and destination nodes may use a flexible thread-based design, where parallel encoding-decoding instances are generated to process packets concurrently. In addition, in some implementations, network coding (and, more specifically, random linear network coding or RLNC) is implemented as a systematic packet erasure code in the network where uncoded packets are transmitted to a destination node along with coded packets. The coded packets then serve as redundant information that may be used to recover original packets in the destination node. This technique may be referred to as systematic RNLC. In the discussion below, an example embodiment is described that uses both threading and systematic RLNC.

Although shown in FIG. 3 as being applied at the IP layer 76, it should be appreciated that the same technique of intercepting packets, applying network coding, and then re-injecting coded packets may be applied at other locations in a stack in other implementations (e.g., the convergence sub-layer 78, the upper or lower MAC layer 80, 82, etc.). Also, as described above, in some implementations, the network coding module 90 is implemented in user-space (e.g., as part of application layer 72) within the node. In other implementations, however, the network coding module 90 (or the functions thereof) may be implemented in other layers or locations in a network, either inside or outside the original node. For example, in one exemplary implementation, the network coding module 90 is implemented within the user space of another node in the network. In such a Implementation, the netfilter 88 may forward the extracted packets to the other node through, for example, a network link or other communication path. The coded packets may then be returned to the first node for re-injection into the stack 70. In addition, in some implementations, the application of network coding may be made part of a corresponding protocol stack and, therefore, would not require an interception and re-injection of packets.

In the embodiments described above, a netfilter 88 is used to intercept IP packets at an IP layer 76 of a protocol stack. The term netfilter is commonly associated with the IP layer and filtration of IP packets. Therefore, in embodiments where the above-described techniques are implemented at other layers of a stack, other types of filters or data element interception functions or devices may be used to Intercept data elements for coding.

Figure 4:
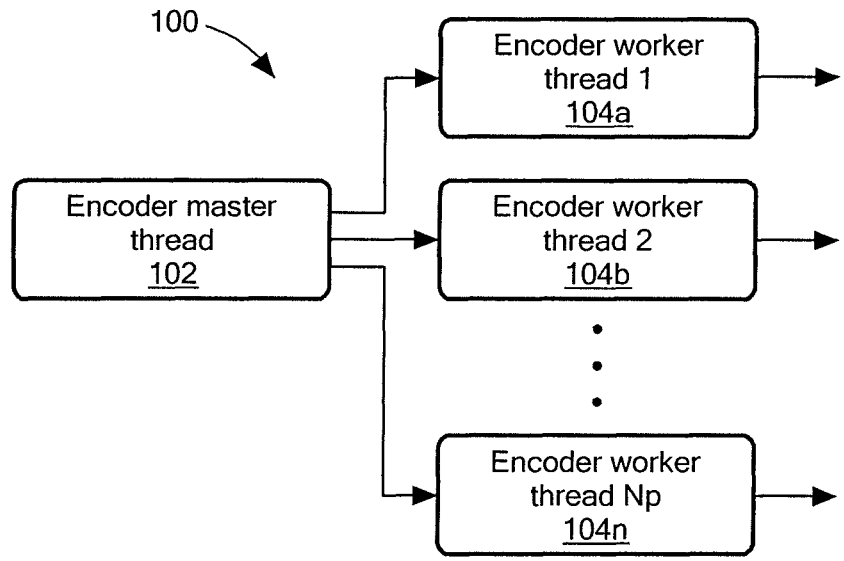
FIGS. 4 and 5 are block diagrams illustrating an encoder process and a decoder process, respectively, in accordance with embodiments.
Figure 5:
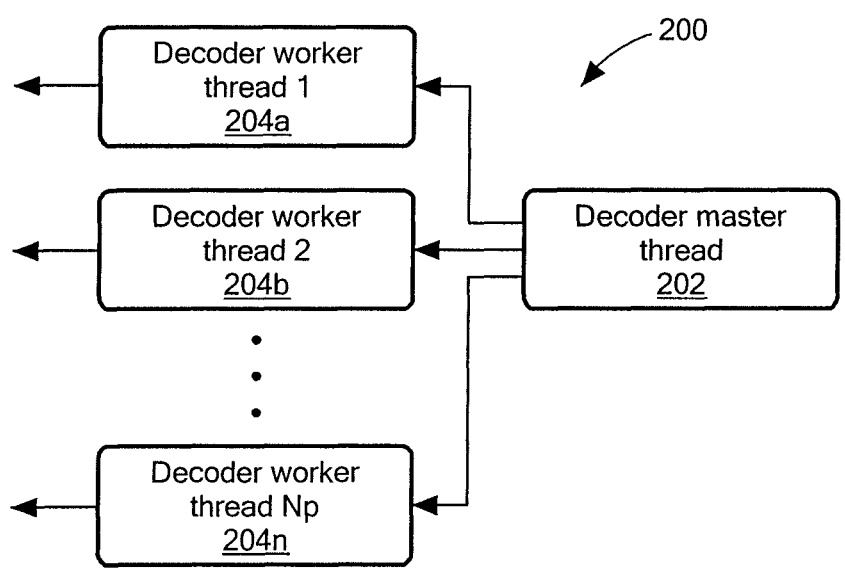

FIGS. 4 and 5 are block diagrams illustrating an encoder process 100 and a decoder process 200, respectively, in accordance with an embodiment. The encoder process 100 may be used, for example, within a source node (or relay node) and the decoder process 200 may be used within a corresponding destination node during a data transfer operation. As shown in FIG. 4, the encoder process 100 may include an encoder master thread 102 and a plurality of encoder worker threads 104a, . . . , 104n. Likewise, with reference to FIG. 5, the decoder process 200 may include a decoder master thread 202 and a plurality of decoder worker threads 204a, . . . , 204n. Each of the encoder worker threads 104a, . . . , 104n in the source node may correspond to one of the decoder worker threads 204a, . . . , 204n in the destination node. Each encoder-decoder thread pair may operate independently from the other pairs and may be identified by a unique thread ID (TID). In some implementations, different worker threads being executed within a node may be processed concurrently within different processors or processor cores associated with the node. In other implementations, multiple worker threads may be executed within a single processor in a node using, for example, time division multiplexing or a similar technique. In still other embodiments, multiple processor cores that each execute multiple worker threads may be used within a node.

The encoder master thread 102 load-balances the encoder worker threads 104a, . . . , 104n by distributing incoming data elements, packets in this embodiment, to the threads 104a, . . . , 104n in a predetermined manner. In at least one embodiment, the master thread 102 distributes the packets in a round-robin fashion, although other techniques may alternatively be used. The encoder worker threads 104a, . . . , 104n may apply network coding to packets distributed to them to generate coded packets. As will be described in greater detail, the unique thread ID associated with each coded packet may be inserted into the coded packet before it is transmitted to the destination node. At the destination node, the decoder master thread 202 directs each incoming coded IP packet to a corresponding decoder worker thread 204a, . . . , 204n according to its TID. The decoder worker thread may then process the packets it receives to recover the original data packets. The original data packets may then be delivered to the appropriate application.

Figure 6:
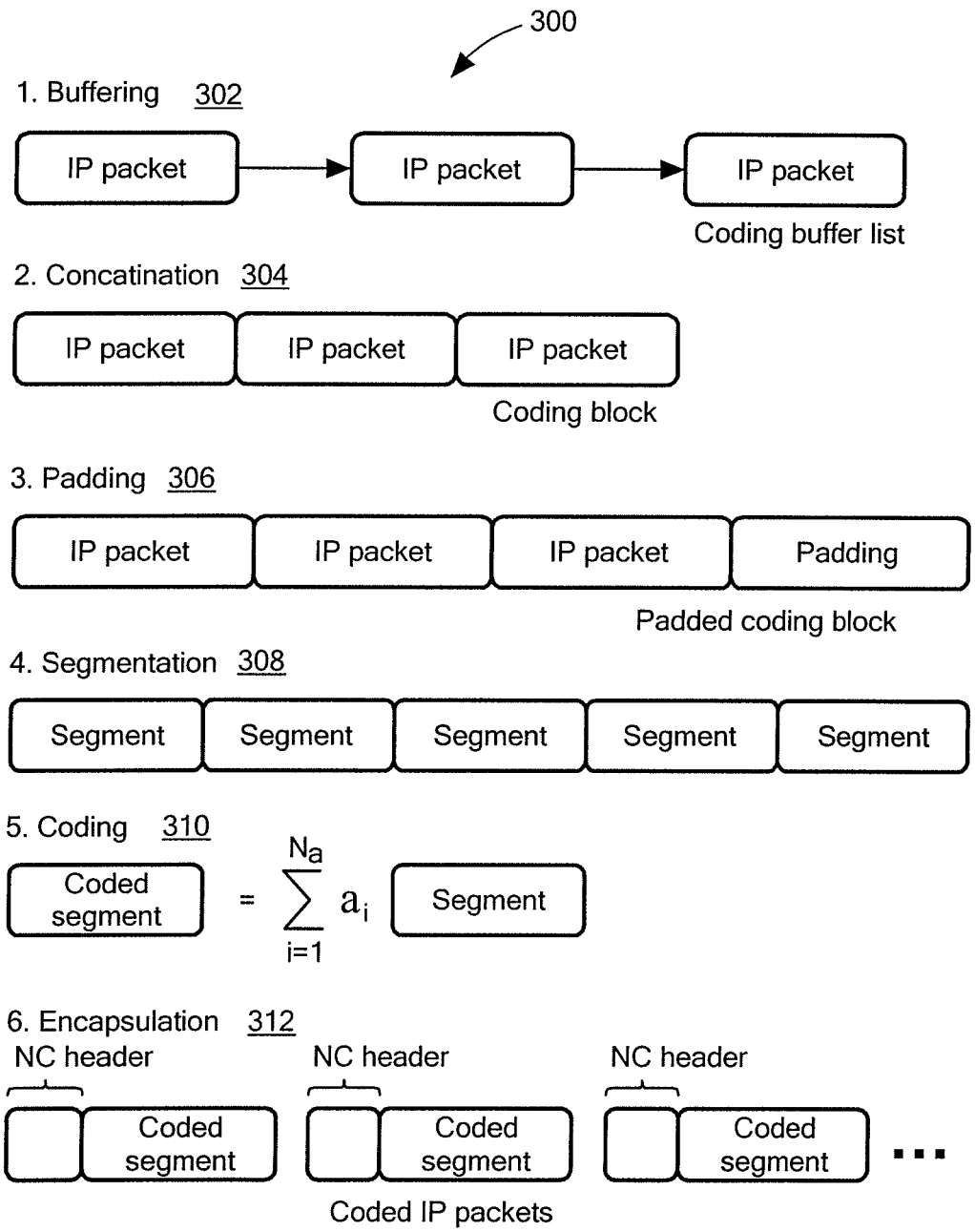
FIG. 6 is a diagram illustrating an exemplary encoding process in accordance with an embodiment.

FIG. 6 is a diagram Illustrating an exemplary encoding process 300 in accordance with an embodiment. The process 300 may be used within, for example, a network coding module associated with a source node in a wireless network. Incoming IP packets may first be buffered (302) and stored successively as a "buffer list" in a master thread associated with a network coding module. The master thread may use a predetermined criterion to determine when a buffer list is ready to handed off to a next available encoder worker thread. In at least one embodiment, the following process may be used to generate buffer lists and determine when they are to be handed off. A timer T may first be initialized. The length $L_b$ of a new buffer list may next be initialized to zero. The length of each new packet received may then be added to $L_b$. This may be repeated for each new packet until T reaches $T_i$ or $L_b$ reaches $L_t$, where $T_i$ is the maximum time to develop the buffer list and $L_t$ is the maximum length of the buffer list. If adding a new packet would result in $L_b$ exceeding $L_t$, the new packet will not be added and will be held for the next buffer list. The current buffer list is then delivered to the next worker thread. The process is then repeated for the next buffer list. This process may be expressed in pseudocode as follows:

```
1:   Initialize timer T
2:   Initialize length L_b of buffer list
3:   while T < T_i and L_b < L_t do
4:       Receive new packet with length L_p
5:       L_b ← L_b + L_p
6:   end while
7:   Transfer buffer list to next worker thread and repeat.
```

Either before or after the present buffer list is transferred to an encoder worker thread, the buffer list may be concatenated into a coding block (304). Next, padding may be added to the coding block (306) to generate a padded coding block that is a multiple of a desired coding segment size. As used herein, a "segment" is the basic unit of operation within the network coding module. In at least one embodiment, the well-known ANSI X.923 byte padding algorithm is used to perform padding. In ANSI X.923, bytes filled with zeros are appended to the data and the last byte stores the number of padded bytes. The coding block may next be divided into equal sized segments (308) having the desired segment size. Random linear network coding (RLNC) may then be used to generate one or more coded segments during a coding process (310). A coded segment may be generated by first generating random coefficients ($a_i$) for each of the segments, multiplying each segment by the corresponding coefficient, and then summing the products together as follows:

$$\text{coded segment} = \sum_{i=1}^{N_s} a_i \cdot \text{segment}$$

A different coded segment may be generated by generating and using new random coefficients.

After coded segments have been generated, the coded segments may be encapsulated (312) by adding NC headers to form coded IP packets. The coded IP packets may then be transmitted to the destination node via the wireless channel. As will be described in greater detail, in some embodiments, all of the segments associated with a particular coding block will be the same size, but the segment size will be allowed to change from coding block to coding block.

In at least one embodiment, the number of segments N, and the segment length $L_s$ that are used for a particular coding block are calculated by the corresponding worker thread (or the master thread) based, at least on part, on the length $L_b$ of the coding block, the maximum length $L_m$ of the segments, and the preferred number $N_r$ of segments. One technique for calculating these values will now be described. As shown below, using this technique, the calculation of the number of segments $N_s$ and the segment length $L_s$ and the addition of padding (e.g., padding 306 of FIG. 6) are performed as together as part of a common process. The current length L of the coding block may first be incremented by 1 byte to serve as a padding boundary. An initial segment length may then be set as $L_s = L_b/N_r$. An initial value of $N_s$ may then be set as $N_r$. The value of $N_s$ may then be repeatedly incremented and the value of $L_s$ may be repeatedly calculated as $$\left\lceil \frac{L_b}{N_s} \right\rceil$$

until $L_s$ is less than or equal to the maximum segment length $L_m$. This process may be expressed in pseudocode as follows:

| | |
|---|---|
| 1: | $L_b \leftarrow L_b + 1$ |
| 2: | $L_b \leftarrow \dfrac{L_b}{N_r}$ |
| 3: | $N_s \leftarrow N_r$ |
| 4: | while $L_s > L_m$ do |
| 5: | $\quad N_s \leftarrow N_s + 1$ |
| 6: | $\quad L_s \leftarrow \left\lceil \dfrac{L_b}{N_s} \right\rceil$ |
| 7: | end while |

As described previously, in some embodiments, random linear network coding (RLNC) is used as a systematic packet erasure code within a wireless network. This will be referred to herein as systematic RLNC. For example, in one approach, after a coding block has been segmented, some or all of the segments may be transmitted to the destination node in an uncoded form. Coded segments may then be transmitted for use as redundant information during subsequent data decoding. In this manner, any uncoded packets that are lost (i.e., erased) in the channel may be recovered in the receiver.

One example technique for implementing systematic RLNC in a wireless network will now be described. $N_s$ uncoded segments may first be generated and sent to the destination node, followed by one or more coded segments. The uncoded segments may each be generated by using a coefficient of 1 for a desired segment and a coefficient of zero for all other segments. The coded segments may be generated using randomly generated coefficients as described previously. The uncoded segments will be referred to herein as "systematic segments" and the coded segments as "nonsystematic segments." In one approach, the nonsystematic segments will be transmitted in a series of rounds, with $N_m$ nonsystematic segments being transmitted in each round. A maximum number of rounds $N_k$ may be specified in some implementations. An inter-round pause of duration $T_r$ may be implemented between rounds to allow other threads to process their blocks. When a decoder worker thread has successfully decoded all original packets, it may send an acknowledgement (ACK) message to the corresponding encoder worker thread.

In some embodiments, when the ACK message is received by the encoder worker thread, the thread will cease to generate and transmit further nonsystematic segments. The encoder worker thread may also cease to generate and transmit nonsystematic segments after $N_k$ rounds have been performed, even if no ACK has been received. This technique protects against inefficiencies related to ACK errors or losses. In at least one embodiment, systematic RLNC is implemented using a Galois Field of size $2^8$. This field size allows each coefficient to be expressed as a single byte. However, other field sizes may be used in other implementations. The above-described process for implementing systematic RLNC may be expressed in pseudocode as follows:

| | | |
|---|---|---|
| 1: | for x = 1 → $N_s$ do | >generate systematic code first |
| 2: | $\quad$ generate an uncoded segment. | |
| 3: | end for | |
| 4: | while ACK has not yet been received do | |
| 5: | $\quad$ for y = 1 → $N_k$ do | |
| 6: | $\quad\quad$ for z = 1 → $N_m$ do | |
| 7: | $\quad\quad\quad$ generate a coded segment | |
| 8: | $\quad\quad$ end for | |
| 9: | $\quad$ wait for duration $T_r$ | |
| 10: | | >terminate if an ACK is received |
| 11: | $\quad$ end for | |
| 12: | end while | |

Figure 7:
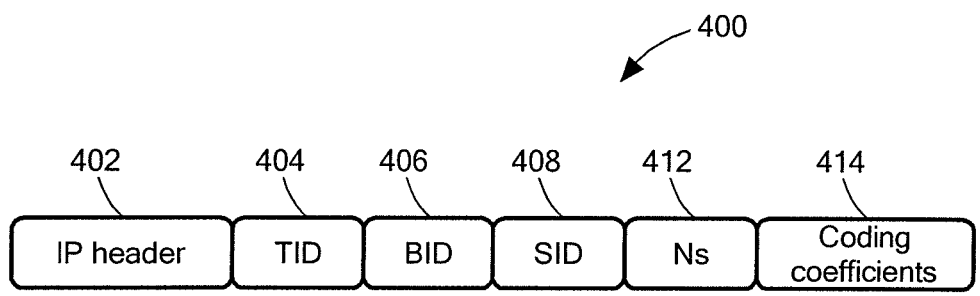
FIG. 7 is a diagram illustrating an NC packet header format that may be used in accordance with an embodiment.

As described above, coded segments generated in a source node may be encapsulated into coded IP packets before transmission. During the encapsulation procedure, an NC header is added to the coded segment. FIG. 7 is a diagram Illustrating an NC header format 400 that may be used in accordance with an embodiment. As shown, the NC header format 400 may include: an IP header field 402, a thread ID (TID) field 404, a block ID (BID) field 406, a segment ID (SID) field 408, a filed 412 for the number $N_s$ of segments in the coding block, and a coding coefficients field 414. Other NC header formats may alternatively be used. Segment length $L_s$ is not included because it can be derived using the packet length field in the IP header 402. The TID identifies which thread the packet belongs to. The BID identifies which block the packet belongs to within a thread. For each thread, the BID may be incremented for every new coded block. The SID keeps track of the individual segments generated for a particular block (i.e., the SID is incremented for each new coded segment that is generated). $N_s$ and the coding coefficients are used during the decoding process.

Figure 8:
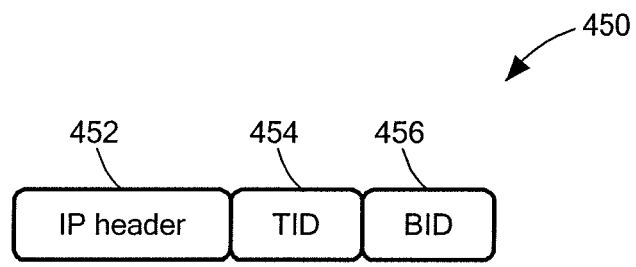
FIG. 8 is a diagram illustrating an ACK packet format that may be used in accordance with an embodiment.

As described above, once a coding block has been decoded (or a decision is made that enough coded packets or degrees of freedom have been received to finish decoding), a decoder worker thread may send an ACK message back to the corresponding encoder worker thread (i.e., the encoder thread having the same TID). FIG. 8 is a diagram illustrating an ACK packet format 450 that may be used in accordance with an embodiment. As shown, the ACK packet 450 may include an IP header 452, a TID 454, and a BID 456. Other ACK formats may alternatively be used.

The decoding process used at a decoder worker thread is essentially a reverse of the encoding process used in the corresponding encoder worker thread (see, e.g., FIG. 6). First, de-capsulation may be performed to strip the NC header from a received coded segment. Each received coded segment may then be used to progressively decode using Gauss-Jordan elimination or a similar technique. Once a coding block has been decoded and reassembled, it may be unpadded and the original uncoded IP packets may be separated. If a packet with a different BID from the current block arrives at a decoder worker thread before a current block is decoded, the decoder may drop the current block and start decoding the new block in some embodiments. An example implementation of a Gauss-Jordan elimination process is shown below in pseudocode. In the process Illustrated below, M represents the current coefficient matrix of incoming coded packets, M[r+1] refers to row r+1 of M, and rank(M) is the rank of M.

```
1:   r ← 0
2:   M_{N_s×(N_s+L_s)} ← 0
3:   for each incoming coded IP packet N_p do
4:       M[r + 1] ← coefficients and segment of N_p
5:       Gauss-Jordan elimination on (r + 1) × (N_s + L_s) of M
6:       if rank(M) = r + 1 then
7:           r ← r + 1
8:           if r = N_s then
9:               done decoding
10:          end if
11:      end if
12:  end for
```

Other techniques for decoding received segments may be used in other embodiments.

When using the above-described techniques, the code rate (CR) may be defined as the ratio of the number $N_s$ of segments to the sum of $N_s$ and the number of redundancy segments:

$$CR \equiv \frac{N_s}{N_s + N_k \times N_m}, \quad (1)$$

where $N_k$ is the number of redundancy rounds, and $N_m$ is the number of redundancy segments transmitted per round. Note that this is an upper bound on the effective code rate, as an ACK may interrupt before $N_k$ rounds of $N_m$ redundancy segments have been transmitted.

In embodiments where systematic RLNC is used, blocks that cannot be decoded can still contain useful information, as some uncoded packets may be extracted. To determine where an IP packet starts in a segment, an additional two-byte field may be provided in the NC header called the start field. The start field allows IP packet defragmentation at the decoder in the event of unsuccessful block decoding.

Assuming one byte per coefficient, the total NC header length may be $L_h+N_s$, where $L_h$ is the length of the NC header without coding coefficients. The NC header overhead ratio would therefore be $$\frac{L_h + N_s}{L_s},$$

where $L_s$ is the segment length. If $N_s$ is 120, $L_h$ is 24, and $L_s$ is 1400, the overhead would be 10.29%. This overhead can be reduced in three ways: 1) by increasing $L_m$, the maximum length of segments, thus increasing $L_s$, 2) by reducing $N_s$, and 3) by sending a seed of a pseudo-random number generator instead of a coefficient vector. Using random seeds, the overhead becomes $$\frac{L_h + q}{L_s},$$

where q is the size of the seed value, typically 4 bytes. Using the previously assumed values of $L_h$ and $L_s$, the overhead is reduced to 2% using this approach.

In order to support random seeds, new fields may be added to the NC header. For example, a type field and either a segment number (segn) or seed.type field may be used to identify whether a packet is coded or uncoded. The parameter segn may be used in a systematic packet to specify the segment number. The seed field may be used in a coded packet as a random seed. A simple pseudo-random number generator may be used to generate the random seed. One such generator, known as Gerhard's generator, is described in pseudo code below. Given a seed a, the generator generates a pseudo-random number from 1 to lim.

```
1:   a ← 1
2:   function RAND(lim)
3:       a ← (a × 32719 + 3) mod 32749
4:       return (a mod lim) + 1
5:   end function
``` where x mod y is the modulo operator. Other random number generators may alternatively be used.

In embodiments described above, various techniques, devices, and architectures were described for implementing network coding within a source node of a network. It should be appreciated that these techniques, devices, and architectures may also be used to perform re-coding in, for example, intermediate or relay nodes within multi-hop networks. For example, instead of decoding packets at a relay node and then applying a new layer of network coding to the decoded information, a relay node may simply collect received data elements such as coded packets and code them together in a re-coding operation before relaying them. In the above description, data elements may denote segments or packets that may be coded or uncoded. Re-coding is particularly well suited for use in scenarios involving two links having different characteristics.

In some embodiments, a re-coding operation is performed as follows. The relay initiates a new encoder worker thread for each received packet having a TID that was previously unknown to the relay node. The re-coding operation includes generating a new coded packet through linearly combining all the previously received packets of the same block through RLNC. Within each block, re-coding is repeated upon each new packet reception, or until a predetermined number of coded packets have been generated or an acknowledgement message has been received from the receiver node. Upon receiving an acknowledgement for any given block, the recoding node ceases transmitting coded packets for that block and sends an acknowledgement upstream to the next transmitting node.

In some embodiments, one or more operational parameters used in a wireless reliability node, system, or architecture may be adapted based on channel-related information. For example, in some implementations, adjustments may be made to one or more of the following operational parameters in a source node based on current channel and/or environmental conditions: number of redundant coded packets, number of segments in a coding block, length of segments in a coding block, number of coded packets within a round, maximum number of rounds, and/or others. In at least one implementation, the channel-related information may include channel state information generated by a channel estimation unit or other structure within the source node. In other implementations, channel-related information or environmental information may be received from a remote node (e.g., as feedback from the destination node). In one exemplary implementation, for example, a source node may receive signal to interference and noise ratio (SINR) information as feedback from a destination node. The source node may then predict packet loss in the channel based on the SINR information and adjust the number of redundant coded packets that will be transmitted based thereon. Other parameters may be adjusted in a similar fashion.

As described previously, the techniques and structures described herein may be used to enhance data transfer reliability within a network or system. Other techniques or mechanisms may also be available to enhance or improve reliability in a network. For example, to alleviate the impact of wireless errors on network performance, the WiMAX standard adopted two retransmission mechanisms: namely, Automatic Repeat reQuest (ARQ) at the upper MAC layer, and Hybrid ARQ (HARQ) at the lower MAC and PHY layers. In both the ARQ and the HARQ mechanisms, a transmitter will determine whether to retransmit information based on whether or not an acknowledgement (ACK) message or a negative acknowledgement (NACK) message is received in response to a transmission. Using the ARQ mechanism, block retransmissions are processed independently. Using HARQ, Forward Error Correction (FEC) and ARQ are combined and subsequent retransmissions of a given information block are jointly processed with the original block. In WiMAX, both the HARQ and ARQ features can be enabled at the same time, leading to joint HARQ/ARQ operation. As will be appreciated, this reliance upon the use of ACK and/or NACK messages can increase overhead in the network.

Other reliability enhancing mechanisms may also (or alternatively) be implemented within a network. For example, in some networks, one or more reliability mechanisms may be provided within the physical layer. These mechanisms may include, for example, various modulation and coding schemes (MCSs) used in the physical layer, adaptive MCS techniques implemented in the physical layer (where the MCS scheme is varied based upon, for example, channel conditions), and/or other techniques.

The network coding techniques described herein may be implemented with or without other reliability enhancing mechanisms. For example, in some implementations, the techniques and features described herein are used within a WiMAX network with both the ARQ and HARQ mechanisms turned off. In fact, in some implementations, the described techniques may be used as the sole reliability enhancing mechanism above the physical layer. In some embodiments, the network coding techniques described herein may be implemented in a coordinated fashion with one or more reliability enhancing mechanisms at the physical layer. That is, the higher layer network coding techniques and the lower, physical layer mechanisms may be jointly optimized to generate an enhanced level of reliability.

As described above, in at least one implementation, a network coding architecture is provided that is capable of significantly decreasing packet loss compared to a network using HARQ or joint HARQ/ARQ mechanisms. There are many possible reasons for this significant improvement. For example, in one sense, the HARQ/ARQ mechanisms may be viewed as a posteriori repetition code adaptation mechanisms, with rates determined by the number of reactive retransmissions for each unit of data. Since retransmissions are packet specific, the rate granularity is low, and the maximum rate is small. By comparison, network coding formulates unique packets into equivalent degrees of freedom, offering three advantages as a code adaptation scheme. First, coded packets can be sent a priori, in expectation of packet losses, thus reducing the effect of large round trip times in ARQ. Second, each newly received degree of freedom can make up for any previously lost packet, thus leading to rate adaptation in steps of 1/block-size, where a block is the group of data packets coded together. Third, HARQ/ARQ relies heavily on the acknowledgment process and is thus prone to ACK/NACK errors, delays, and losses, which in turn can result in inefficient retransmission of correctly received packets. Network coding is less sensitive, since each transmitted coded packet is a new degree of freedom that can be useful in decoding. The combination of proactive transmissions, rate adaptation with a finer granularity, and robustness to ACK losses can make network coding an efficient alternative reliability mechanism. It is also more in-line with the ever increasing speed and performance of a priori adaptive modulation and coding at the PHY layer.

The techniques and structures described herein may be implemented in any of a variety of different devices or systems that may operate as, or be part of, a network node. In some implementations, techniques or features may be embodied as instructions and/or data structures stored on non-transitory computer readable media that may be read and executed by a computing system. Computer readable media may include, for example, floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for use in providing reliable data transfer in a wireless network, the method comprising:
   obtaining data elements associated with a data transfer operation between a first node and a remote second node;
   distributing the data elements among a plurality of encoder worker threads; and
   employing random linear network coding (RLNC) in the encoder worker threads to generate, for corresponding data elements, coded segments for transmission from the first node to the second node;

obtaining data elements includes intercepting data elements at a predetermined point within a protocol stack;

intercepting data elements includes intercepting internet protocol (IP) packets at an IP layer of the protocol stack; and transmitting the coded segments from the first node to the second node, wherein transmitting the coded segments includes injecting the coded segments into the IP layer of the protocol stack.

2. The method of claim 1, further comprising:

generating uncoded segments in at least one of the encoder worker threads for corresponding data elements; and transmitting the coded and uncoded segments from the first node to the second node for implementing systematic RLNC.

3. The method of claim 1, wherein:

obtaining data elements includes intercepting data elements at a predetermined point within a protocol stack.

4. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein distributing the data elements among a plurality of encoder worker threads includes buffering the data elements, generating a plurality of buffer lists that each includes one or more data elements, and distributing the buffer lists among the plurality of encoder worker threads.

5. The method of claim 4, wherein:

distributing the buffer lists includes distributing the buffer lists to the encoder worker threads in a round robin fashion.

6. The method of claim 4, wherein:

generating a plurality of buffer lists includes, for each successive buffer list:
acquiring a new data element;
adding the new data element to a current buffer list; and
repeating acquiring and adding until a maximum buffer list processing time has been reached or the maximum buffer list size has been reached.

7. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node;

concatenating data elements distributed to a first encoder worker thread to form a first coding block;

segmenting the first coding block into segments having a first segment size, wherein segmenting includes padding the first coding block if a size of the first coding block is not a multiple of the first segment size; and wherein employing random linear network coding includes: (a) generating random coefficients for the segments; and (b) linearly combining the segments using the random coefficients to generate a first coded segment in the first encoder worker thread.

8. The method of claim 7, wherein:

employing random linear network coding further includes repeating generating and linearly combining to generate other coded segments in the first encoder worker thread until a predetermined number of coded segments has been generated or an acknowledgement message has been received from a corresponding processing thread in the second node.

9. The method of claim 7, further comprising:

determining, before segmenting the first coding block, a segment length and a number of segments to use in performing random linear network coding for the first coding block, wherein the determining of the segment length and is based at least in part on a length of the first coding block.

10. The method of claim 7, further comprising:

adding a header to the first coded segment, the header including a thread identifier (TID) to identify a thread associated with the first coded segment.

11. The method of claim 7, further comprising:

adjusting at least one of: a number of coded segments to transmit to the second node, a number of segments in a coding block, a length of segments in a coding block, a number of coded segments within a transmission round, and a maximum number of coded segment transmission rounds, based at least in part on channel-related information.

12. The method of claim 11, wherein:

the channel-related information includes at least one of: channel estimates generated within the first node and feedback information received from the second node.

13. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein the encoder worker threads are implemented in the first node.

14. The method of claim 13, further comprising:

generating uncoded segments in at least one of the encoder worker threads for corresponding data elements; and transmitting the coded and uncoded segments from the first node to the second node for implementing systematic RLNC.

15. The method of claim 13, wherein:

obtaining data elements includes intercepting data elements at a predetermined point within a protocol stack.

16. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein the encoder worker threads are implemented at a location outside the first node.

17. The method of claim 16, further comprising generating uncoded segments in at least one of the encoder worker threads for corresponding data elements.

18. The method of claim 16, wherein obtaining data elements includes intercepting data elements at a predetermined point within a protocol stack.

19. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein:

the first node is a relay node and obtaining data elements includes receiving coded packets at the relay node; and employing RLNC in the encoder worker threads includes re-coding the coded packets using RLNC.

20. The method of claim 19, further comprising:

initiating a new encoder worker thread at the relay node for each received packet having a thread identifier (TID) that was previously unknown to the relay node;

performing re-coding among packets of the same block;

repeating re-coding in the relay node's encoder worker thread within each block, upon each new packet reception, or until a predetermined number of coded packets has been generated or an acknowledgement message has been received from a corresponding processing thread in the second node; and ceasing transmission of coded packets for any given block and sending an acknowledgement upstream to the next transmitting node upon receiving an acknowledgement for the block.

21. A method for use in providing reliable data transfer in a wireless network, the method comprising obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein the method is performed in coordination with one or more physical layer reliability enhancement mechanisms.

22. The method of claim 21, further comprising:

generating uncoded segments in at least one of the encoder worker threads for corresponding data elements; and transmitting the coded and uncoded segments from the first node to the second node for implementing systematic RLNC.

23. The method of claim 21, wherein:

obtaining data elements includes intercepting data elements at a predetermined point within a protocol stack.

24. A method for use in providing reliable data transfer in a wireless network, the method comprising:

obtaining data elements associated with a data transfer operation between a first node and a remote second node;

distributing the data elements among a plurality of encoder worker threads; and employing random linear network coding (RLNC) in the encoder worker threads to generate, for corresponding data elements, coded segments for transmission from the first node to the second node; and wherein the first and second nodes are part of a wireless municipal area network.

25. The method of claim 24, further comprising:

generating uncoded segments in at least one of the encoder worker threads for corresponding data elements; and transmitting the coded and uncoded segments from the first node to the second node for implementing systematic RLNC.

26. The method of claim 24, wherein:

obtaining data elements includes intercepting data elements at a predetermined point within a protocol stack.

* * * * *

UNITED STATES PATENT AND TRADEMARK OFFICE
CERTIFICATE OF CORRECTION

PATENT NO. : 9,185,529 B2  
APPLICATION NO. : 13/968566  
DATED : November 10, 2015  
INVENTOR(S) : Muriel Medard et al.

It is certified that error appears in the above-identified patent and that said Letters Patent is hereby corrected as shown below:

In the Specification

Column 2, Line 50, delete "length and is" and replace with --length is--.

Column 8, Line 41, delete "5d0" and replace with --50--.

Column 8, Line 58, delete "digital signals" and replace with --digital signal--.

Column 11, Line 1, delete "run" and replace with --running--.

Column 11, Line 14, delete "RNLC." and replace with --RLNC.--.

Column 11, Line 31, delete "a Implementation" and replace with --an implementation--.

Column 12, Line 30, delete "to handed" and replace with --to be handed--.

Column 13, Line 21, delete "segments N, and" and replace with --segments $N_s$ and--.

Column 13, Lines 30-31, delete "as together as" and replace with --together as--.

Column 13, Line 31, delete "length L of" and replace with --length $L_b$ of--.

Column 14, Line 57, delete "a filed" and replace with --a field--.

In the Claims

Column 22, Line 2, delete "comprising" and replace with --comprising:--.

Signed and Sealed this  
Ninth Day of August, 2016

Michelle K. Lee  
*Director of the United States Patent and Trademark Office*